United States Patent
Derks et al.

(10) Patent No.: US 10,845,980 B2
(45) Date of Patent: Nov. 24, 2020

(54) FACILITATING MOVEMENT OF GRAPHICAL OBJECTS ACROSS SEPARATE SCREENS

(71) Applicant: Microsoft Technology Licensing, LLC, Redmond, WA (US)

(72) Inventors: Patrick Joseph Derks, Seattle, WA (US); Peter Eugene Hammerquist, Shoreline, WA (US); Eric J. Hull, Seattle, WA (US); Sophors Khut, Seattle, WA (US); Cassandra April King, Seattle, WA (US); Christian Klein, Duvall, WA (US); Bryan Mamaril, Seattle, WA (US); Nishad Mulye, Sammamish, WA (US); Kenton Allen Shipley, Woodinville, WA (US); Daniel Edward Stafford, Seattle, WA (US)

(73) Assignee: Micosoft Technology Licensing, LLC, Redmond, WA (US)

(*) Notice: Subject to any disclaimer, the term of this patent is extended or adjusted under 35 U.S.C. 154(b) by 98 days.

(21) Appl. No.: 15/939,173

(22) Filed: Mar. 28, 2018

(65) Prior Publication Data

US 2019/0302980 A1  Oct. 3, 2019

(51) Int. Cl.
*G06F 3/0486* (2013.01)
*G06F 3/14* (2006.01)
(Continued)

(52) U.S. Cl.
CPC .......... *G06F 3/0486* (2013.01); *G06F 3/0481* (2013.01); *G06F 3/04842* (2013.01);
(Continued)

(58) Field of Classification Search
CPC .... G06F 3/1423; G06F 3/1438; G06F 3/0488; G06F 3/0416; G06F 3/0483;
(Continued)

(56) References Cited

U.S. PATENT DOCUMENTS

| 6,545,669 | B1 | 4/2003 | Kinawi et al. |
| 8,510,381 | B1* | 8/2013 | Birand .................. G06Q 10/10 709/204 |

(Continued)

FOREIGN PATENT DOCUMENTS

| EP | 2226713 A1 | 9/2010 |
| WO | 2016197248 A1 | 12/2016 |

OTHER PUBLICATIONS

M. Reardon, "Augmented reality comes to mobile phones," CNET web site, published Sep. 29, 2010, downloaded from https://www.cnet.com/news/augmented-reality-comes-to-mobile-phones/ (Year: 2010).*

(Continued)

*Primary Examiner* — Eric J Yoon

(57) ABSTRACT

A technique is described herein for facilitating movement of graphical objects across display screens. In one manner of operation, the method includes: displaying a representation of a first movement as a user moves a graphical object across a source screen; detecting that the user has moved the graphical object into a graphical source portal associated with the source screen; associating the graphical object with two or more graphical destination portals provided by the plural display screens, in addition to the graphical source portal, such that the graphical object is accessible from the graphical source portal and any graphical destination portal; detecting that the user has removed the graphical object from a chosen graphical portal in a chosen screen; displaying the graphical object as having been removed from all graphical portals; and displaying a second movement as the user moves the graphical object across the chosen screen to a final destination.

19 Claims, 12 Drawing Sheets

(51) Int. Cl.
*G06F 3/0481* (2013.01)
*G06F 3/147* (2006.01)
*G06F 3/0484* (2013.01)

(52) U.S. Cl.
CPC ............ *G06F 3/147* (2013.01); *G06F 3/1423* (2013.01); *G06F 3/1446* (2013.01); *G06F 3/1454* (2013.01); *G09G 2354/00* (2013.01)

(58) Field of Classification Search
CPC .. G06F 3/04883; G06F 3/0486; G06F 3/0481; G06F 3/04842; G06F 3/1454
See application file for complete search history.

(56) References Cited

U.S. PATENT DOCUMENTS

| | | | | |
|---|---|---|---|---|
| 9,239,846 B2 * | 1/2016 | Besen | ................. | G06F 16/1844 |
| 9,875,075 B1 * | 1/2018 | VanBlon | ............... | G06F 3/1454 |
| 2007/0124503 A1 * | 5/2007 | Ramos | ................... | G06F 3/017 |
| | | | | 709/248 |
| 2010/0313143 A1 | 12/2010 | Jung et al. | | |
| 2013/0019182 A1 * | 1/2013 | Gil | ........................ | G06F 3/0482 |
| | | | | 715/738 |

OTHER PUBLICATIONS

Simeone et al., "A Cross Device Drag-and-Drop Technique," MUM '13, published Dec. 5, 2013 (Year: 2013).*

Baudisch, et al., "Drag-and-Pop and Drag-and-Pick: Techniques for Accessing Remote Screen Content on Touch- and Pen-Operated Systems," in Proceedings of the International Conference on Human-Computer Interaction, 2003, 8 pages.

Jul, Susanne, "Predictive Targeted Movement in Electronic Spaces," in CHI '02 Extended Abstracts on Human Factors in Computing Systems, 2002, 2 pages.

PCT Search and Written Opinion for PCT Application No. PCT/US2019/023487, dated Jun. 21, 2019, 14 pages.

* cited by examiner

1402 →

1404. RECEIVE AN INSTRUCTION FROM THE USER TO SELECTIVELY RETRIEVE THE GRAPHICAL OBJECT FROM THE CHOSEN SCREEN.

↓

1406. IN RESPONSE TO THE INSTRUCTION, SELECTIVELY DISPLAY THE GRAPHICAL OBJECT AS POSITIONALLY COUPLED TO ONE OR MORE GRAPHICAL PORTALS ASSOCIATED WITH THE CHOSEN SCREEN.

1504. DETERMINE A LOCATION OF THE USER WITH RESPECT TO EACH OF THE PLURAL SCREENS.

↓

1506. SELECTIVELY DISPLAY THE GRAPHICAL OBJECT AS POSITIONALLY COUPLED TO ONE OR MORE GRAPHICAL PORTALS IN A CONDITIONAL MANNER, BASED ON THE LOCATION OF THE USER RELATIVE TO EACH OF THE PLURAL SCREENS.

1604. DETERMINE A PREFERRED GRAPHICAL PORTAL FROM WHICH THE USER HAS RETRIEVED GRAPHICAL OBJECTS ON TWO OR MORE PRIOR OCCASIONS.

↓

1606. SELECTIVELY DISPLAY THE GRAPHICAL OBJECT AS POSITIONALLY COUPLED TO THE PREFERRED GRAPHICAL PORTAL.

1704. DETECT THAT THE USER HAS MOVED AT LEAST TWO DISPLAY SCREENS WITHIN A PRESCRIBED PHYSICAL PROXIMITY TO EACH OTHER.
↓
1706. INVOKE A SCREEN-SHARING MODE BETWEEN THE TWO DISPLAY SCREENS IN RESPONSE TO BLOCK 1704.

1804. DETERMINE THAT THE USER HAS PERFORMED A TELLTALE GESTURE TO INITIATE THE FIRST MOVEMENT, THE TELLTALE GESTURE BEING ASSOCIATED WITH A SCREEN-TO-SCREEN MOVEMENT OPERATION.
↓
1806. INVOKE A SCREEN-SHARING MODE BETWEEN AT LEAST TWO DISPLAY SCREENS IN RESPONSE TO DETERMINING THAT THE USER HAS PERFORMED THE TELLTALE GESTURE.

1904. PROVIDE A CONFIGURATION INTERFACE TO THE USER.
↓
1906. RECEIVE CONFIGURATION INFORMATION FROM THE USER VIA THE CONFIGURATION INTERFACE, THE CONFIGURATION INFORMATION GOVERNING: A POSITIONAL PLACEMENT OF EACH GRAPHICAL PORTAL ON EACH OF THE PLURAL SCREENS, AND/OR A BEHAVIOR OF EACH GRAPHICAL PORTAL.

FIG. 19

FACILITATING MOVEMENT OF GRAPHICAL OBJECTS ACROSS SEPARATE SCREENS

BACKGROUND

Many users interact with applications using plural display screens. For example, a user may configure a desktop computing device such that it controls two or more physical display monitors. For instance, the user may set up the computing device such that it provides a single user interface presentation that extends over the two or more physical display monitors.

However, multi-display setups have limitations. Assume that each display screen is associated with a touch sensitive surface with which the user may interact using his or her finger, a pen, etc. In many cases, a user cannot perform a gesture across two display screens because there is a physical gap that separates the adjacent edges of the two display screens. This is because the user will disrupt the gesture when he or she lifts a finger or pen upon encountering the gap.

SUMMARY

A technique is described herein for facilitating movement of graphical objects across plural display screens. In one manner of operation, the method includes: displaying a representation of a first movement as a user moves a graphical object across a source screen; detecting that the user has moved the graphical object into a graphical source portal associated with the source screen; associating the graphical object with two or more graphical destination portals provided by the plural display screens (in addition to the graphical source portal), such that the graphical object is accessible from the graphical source portal and any graphical destination portal; detecting that the user has removed the graphical object from a chosen graphical portal in a chosen screen; displaying the graphical object as having been removed from all graphical portals; and displaying a second movement as the user moves the graphical object across the chosen screen to a final destination.

Metaphorically, a graphical source portal of a source screen defines an entrance to at least one tunnel or "wormhole" which connects the source screen to at least one destination screen (or to a different location on the source screen). A destination portal defines the exit of a tunnel or wormhole. In other words, a source portal may have a one-to-many relation to a set of destination portals. A user may pass graphical objects through the tunnels. A graphical object generally corresponds to any visible identifier that represents any underlying resource (or resources), or no underlying resource(s).

For example, assume that the display setup includes three screens that collectively provide a user interface experience. In one particular use case, one of the three screens serves as a source screen, while the other two serve as potential destination screens. Upon moving a graphical object into a graphical source portal associated with the source screen, the technique displays the graphical object as being positionally coupled to the graphical source portal and the graphical destination portals of both of the destination screens. The user may pull the graphical object out of a graphical destination portal provided by either of the two destination screens, or the graphical source portal provided by the source screen. More generally, a display setup can include any number of screens, any of which may function as a source screen or destination screen in a given context.

In some implementations, the PMC displays at least some portals in positional association with edges of the screens. Alternatively, or in addition, the PMC may display at least some portals in positional association with non-edge regions of any screen.

In some implementations, the screens include two or more kinds of portals. In this case, when the user drags a graphical object to a graphical source portal of a particular kind (e.g., kind X), that graphical object selectively appears in graphical destination portal(s) of that particular kind (kind X) (and not in graphical destination portals of other kinds (e.g., kind Y)).

The above-described technique accommodates a screen-to-screen drag operation because the act of placing a graphical object in a graphical portal does not terminate the drag operation; rather, it suspends it.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 14 shows a process for selectively displaying the graphical object in at least one, but not all, of the graphical portals.

FIG. 15 shows another process for selectively displaying the graphical object in at least one, but not all, of the graphical portals.

FIG. 16 shows another process for selectively displaying the graphical object in at least one, but not all, of the graphical portals.

FIG. 17 shows a process for automatically invoking aspects of the process of FIG. 13.

FIG. 18 shows another process for automatically invoking aspects of the process of FIG. 13.

FIG. 19 shows a process for configuring the PMC of FIG. 12.

Figure 1:
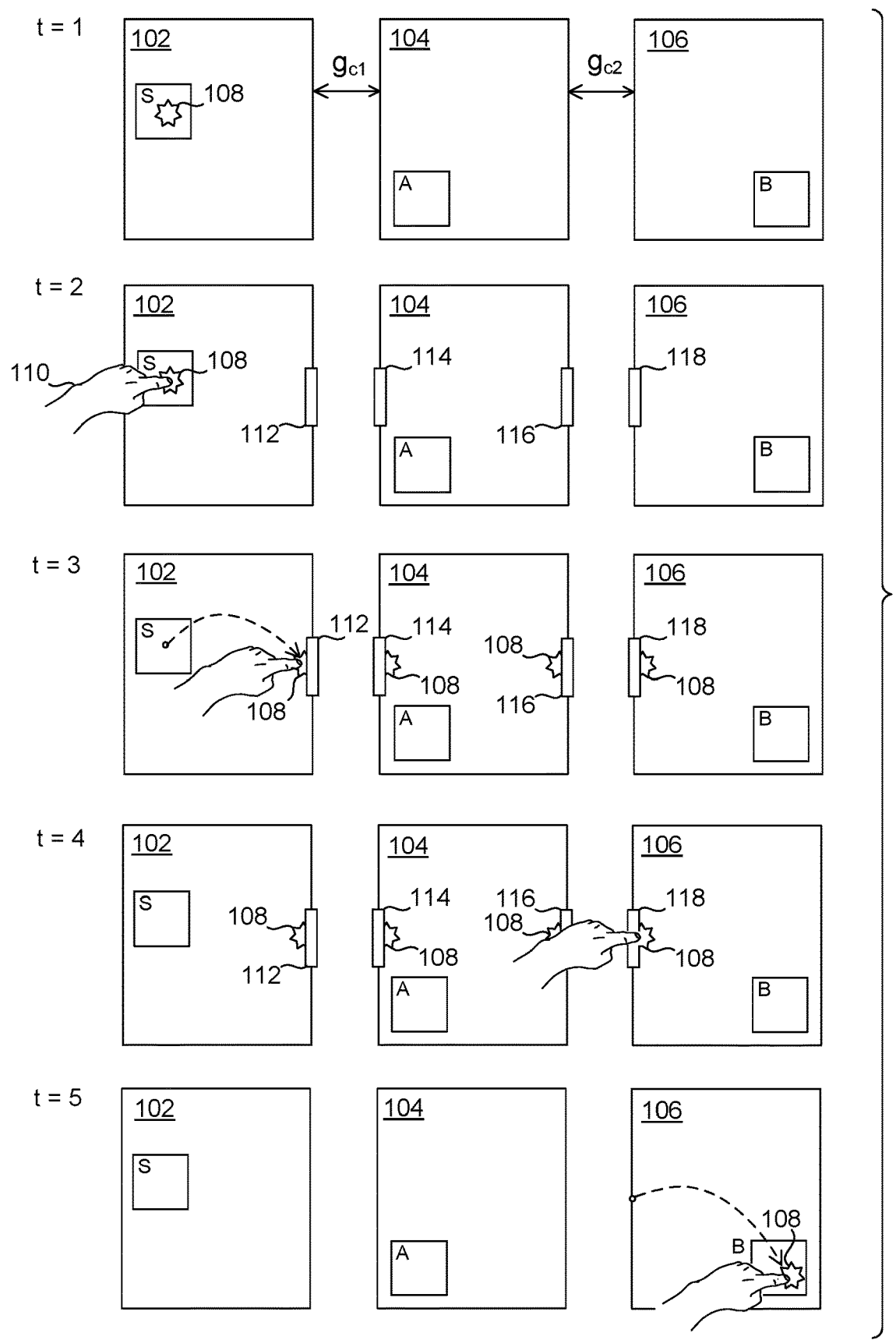
FIG. 1 shows a first example of the operation of a graphical portal management component (PMC). The PMC facilitates movement of graphical objects across display screens using graphical portals.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes one or more computing devices for facilitating the movement of graphical objects across display screens. Section B sets forth illustrative methods which explain the operation of the computing device(s) of Section A. And Section C describes illustrative computing functionality that can be used to implement any aspect of the features described in Sections A and B.

As a preliminary matter, the term "hardware logic circuitry" corresponds to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section C provides additional information regarding one implementation of the hardware logic circuitry.

The terms "component," "unit," "element," etc. refer to a part of the hardware logic circuitry that performs a particular function. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Computing Devices

A.1. Illustrative User Interface Experience

This subsection shows examples of the operation of a graphical portal management component (PMC). The PMC facilitates movement of graphical objects across display screens using graphical portals. Subsection A.2, below, provides details regarding illustrative implementations of the PMC. A screen generally refers to any physical mechanism for displaying a user interface presentation. In some cases, a set of n display devices of any type(s) may be associated with a respective set of n display screens. Alternatively, or in addition, a single display device (in conjunction with a computing device) can provide two or more display screens (such as by providing two or more virtual desktop presentations, or two or more screens presented in different portions of a display surface, etc.).

In the scenario of FIG. 1, the PMC controls three display screens (102, 104, 106). For example, the PMC can configure the display screens (102, 104, 106) to present a single extended user interface presentation. In another mode (not shown), the PMC can configure the display screens (102, 104, 106) to present three identical versions of the same user interface presentation. In still another mode (not shown), the PMC can configure the display screens (102, 104, 106) to present at least two independent user interface presentations, e.g., provided by two respective user computing devices. Still other display modes are possible.

Further note that other scenarios can include any number of display screens; the use of three display screens in FIG. 1 is merely illustrative. Moreover, other scenarios can arrange the display screens according to any configuration. The displays screens, for instance, need not be placed side-by-side in a row as shown. In other scenarios, at least two display screens can be arranged face-to-face.

A gap $g_{c1}$ separates the first display screen 102 from the second display screen 104. A gap $g_{c2}$ separates the second display screen 104 from the third display screen 106. Each gap represents a separation of any non-zero distance. One or more kinds of materials may fill each gap, such as air, plastic or metal bezel material, etc., or any combination thereof.

The user may interact with the display screens (102, 104, 106) through various mechanisms, such as, without limitation, touch input, pen input (including active pen input and passive pen input), stylus input, mouse device input, digitizer input, and so on. With respect to at least some input mechanisms, the display screens (102, 104, 106) include a touch-sensitive surface. Any technology can be used to implement the touch-sensitive surfaces, such as capacitance-related technology, resistance-related technology, optical-related technology, and so on, or any combination thereof. (Note that a mouse input device or a digitizer input device is not necessarily subject to any physical obstacles that would prevent moving a graphical object between display screens; nevertheless, the features described below are useful in these input contexts for those environments that prohibit screen-to-screen mouse drags and digitizer drags.)

Finally, assume that the first display screen 102 shows a source domain S. For example, the source domain S may correspond to a window provided by an application S that performs any function. Assume that the second display screen 104 shows a domain A, such as a window provided by an application A. And assume that the third display screen 106 includes a domain B, such as a window provided by an application B. This display information is merely illustrative.

At time t=1, assume that the source domain S in the first display screen 102 includes a graphical object 108. (The first display screen is also referred to herein as a source screen because, in this merely illustrative context, it is the screen from which the graphical object 108 originates.) The graphical object corresponds to a visible identifier that has any appearance, and may represent any underlying resource (or resources) (or no underlying resource(s)). For example, the source domain S may correspond to a photo-editing application, and the graphical object 108 may correspond to an identifier of any type that represents a digital photograph. In other cases, the graphical object 108 may represent one or more videos, one or more links, one or more audio items, etc., or any combination thereof. In other cases, the graphical object may correspond to an application window, an application icon, a widget, etc. In some environments, the movement of a graphical object may involve a transfer of its underlying resource(s); in other implementations, movement of a graphical object does not necessarily involve a corresponding movement of its underlying resource(s).

At t=2, assume that the user commences a drag operation by touching the graphical object 108 with a finger of his or her hand 110. Upon determining that the user has initiated a drag movement, the PMC displays a set of graphical portals (112, 114, 116) on the three display screens (102, 104, 106). More specifically, without limitation, the PMC shows: a first graphical portal 112 in the middle of the right edge of the first display screen 102; a second graphical portal 114 in the middle of the left edge of the second display screen 104; a third graphical portal 116 in the middle of the right edge of the second display screen 104; and a fourth graphical portal 118 in the middle of the left edge of the third display screen 106. In this configuration, the first and second graphical portals (112, 114) form an adjacent pairing of portals, and the third and fourth graphical portals (116, 118) form an adjacent pairing of portals. This placement of graphical portals is merely illustrative. In other implementations, for instance, the graphical portals need not be located on the edges of the display screens.

A graphical portal corresponds to a graphical receptacle for temporarily holding the graphical object 108. In the merely illustrative implementation, the PMC represents each graphical portal as a slot along the edge of a screen, with or without a label. The portal can have any other display attributes in other implementations, such as different shapes, sizes, colors, intensity levels, transparency levels, etc. In other cases, the PMC can control the graphical portal so that it moves a small distance back and forth in one or more directions, so as to appear to vibrate; this feature helps draw the user's attention to the graphical portal. In another implementation, the PMC can produce flashing graphical portals, etc.

Between t=2 and t=3 the user performs a first movement in which the user drags the graphical object 108 from the source domain S to the first graphical portal 112. That is, the user performs this task by holding his or her finger on the graphical object 108 and dragging the graphical object 108 to the first graphical portal 112.

At t=3, upon parking the graphical object 108 in the first graphical portal 112 (the graphical source portal), the PMC associates a representation of the same graphical object 108 with each graphical portal, including graphical portals 112, 114, 116, and 118. More specifically, the PMC displays the graphical object as if lodged in, or positionally coupled to, each graphical portal. The user may then remove his or her finger from the first display screen 102. This action does not discontinue the drag operation. Rather, the PMC interprets the user's action as having temporarily suspended the drag operation. The user may henceforth extract the graphical object 108 from any graphical portal (including the graphical source portal 112) to perform a second phase of the drag movement.

This explanation refers to any graphical portal from which the user can pull the graphical object 108 as a graphical destination portal (except for the graphical portal 112, which, as mentioned above, is referred to as a graphical source portal). This explanation refers to any display screen (other than the source screen) which hosts a graphical destination portal as a destination screen. More generally, note that any display screen can operate as a source screen or a destination screen depending on the role it serves in a particular context.

The PMC can display the graphical object 108 in the graphical portals (112, 114, 116, 118) in a manner to draw the user's attention to the fact that the object is in an intermediate state, and that the PMC expects the user to take further action on the graphical object 108. For example, the PMC can produce a vibrate effect or flashing effect to display the graphical object 108 in the manner described above.

At t=4, assume that the user chooses to pull the graphical object 108 out of the fourth graphical portal 118 which is presented on the third display device 106. More specifically, between t=4 and t=5, the user extracts the graphical object from the fourth graphical portal 118 and drags it over to the domain B. The PMC responds to the user pulling the graphical object 108 out of the fourth graphical portal 118 by disassociating the graphical object 108 from all graphical portals (112, 114, 116, 118). It also removes the visual representation of the graphical object 108 from all of the graphical portals (112, 114, 116, 118). In other implementations, the PMC can maintain a copy of the graphical object 108 in each graphical portal until the user completes the drag operation (described below).

After time t=5, assume that the user removes his or her finger from the graphical object 108. At this juncture, the PMC interprets the drag operation as completed. The PMC can optionally notify application S which hosts the domain S of this completion event. The PMC can also transfer appropriate information to an application B which controls the domain B. In this context, the domain B can be considered a target domain because it represents the final destination of the graphical object 108. In some cases, the graphical object represents an underlying resource (such as a file), and the PMC responds to the user's gesture by associating the underlying resource with the domain B, e.g., by associating a file with an application which controls the domain B. This operation may involve moving a resource from a source location to a destination location, or moving a copy of the resource to the destination location, etc.

Overall, the PMC provides an efficient manner of dragging graphical objects across gaps between display screens. This allows user to perform inter-screen gestures that would not otherwise be possible or practical. For example, in a traditional gesture operation, an operating system would terminate a drag operation whenever the user lifted his or her finger from the surface of a display screen. In contrast, the PMC will pause the drag operation whenever the user "parks" the graphical object in any graphical portal.

Further note that, in addition to temporarily holding a graphical object, a graphical portal serves as an entrance or exit to a metaphorical tunnel. That is, metaphorically, a graphical source portal of a source screen defines an entrance to at least one tunnel or "wormhole" which connects a source screen to at least one destination screen (or to a different location on the source screen). A destination portal defines the exit of a tunnel or wormhole. In other words, a source portal may have a one-to-many relation to a set of destination portals. The user may pass graphical objects through the tunnels.

Presume, contrary to the example of FIG. 1, that the user never removes the graphical object 108 from any of the graphical portals. The PMC can handle this situation in an environment-specific and user-configurable manner. For example, the PMC can remove the graphical portals (and the graphical object 108 parked therein) upon the lapse of a prescribed amount of time following the placement of the graphical object 108 into the graphical portals. Or the user can explicitly cancel a drag operation by swiping the graphical object 108 off any display screen, and so on.

Figure 2:
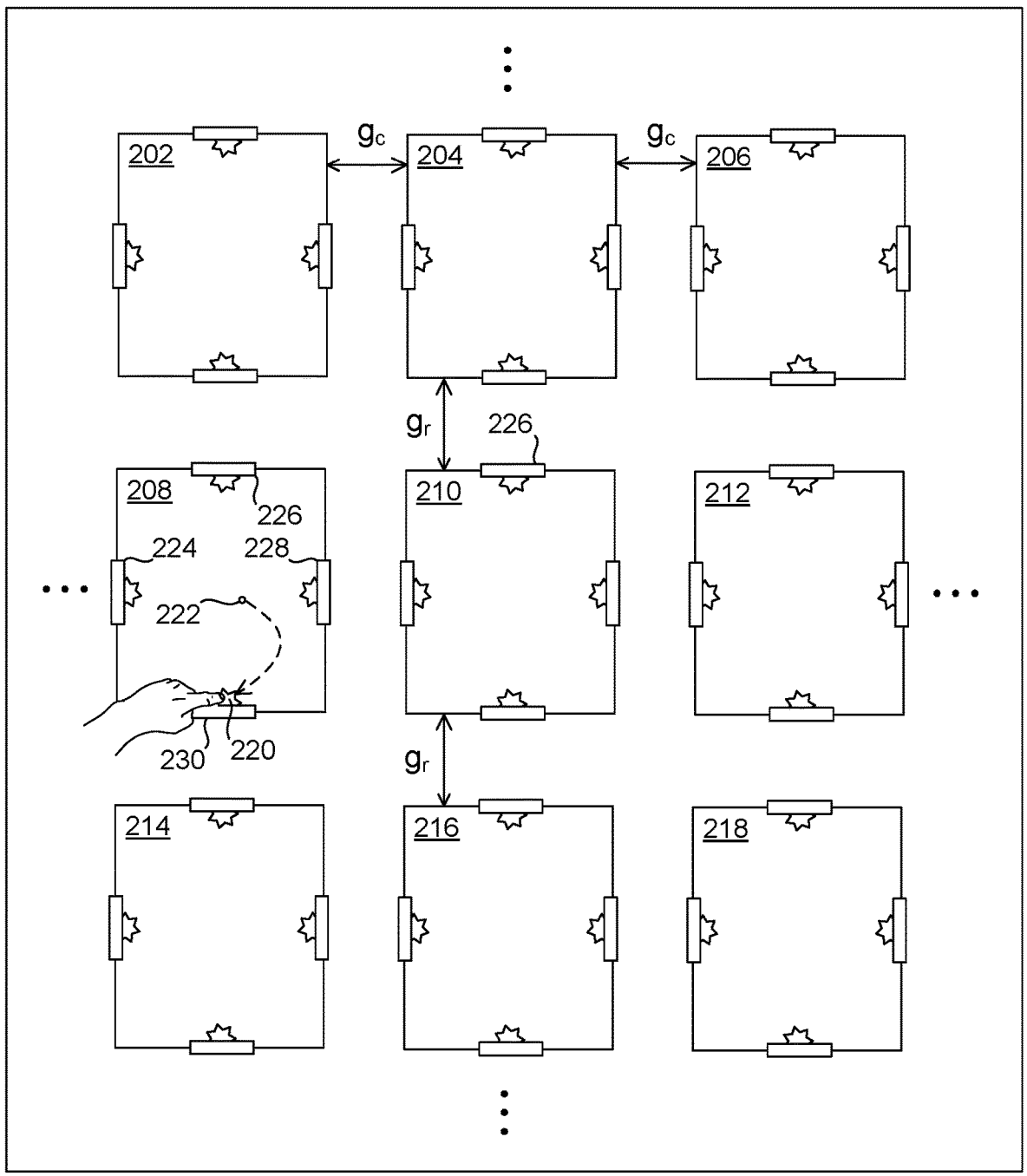
FIG. 2 shows a second example of the operation of the PMC.

Advancing to FIG. 2, this figure shows a configuration that includes at least nine display screens (202, 204, 206, 208, 210, 212, 214, 216, 218) arranged in an array. For instance, the display configuration shown in FIG. 2 may correspond to a panelized wall or table display. Assume that a gap $g_c$ separates each adjacent column of display screens, and a gap $g_r$ separates adjacent rows of display screens. (In an actual wall display, these gaps ($g_c$, $g_r$) will typically be smaller than illustrated in FIG. 2.)

Assume that, prior to the time illustrated in FIG. 2, the user moved a graphical object 220 which appears in the fourth display screen 208 across that display screen, starting from an initial position 222. This means that the fourth display screen 208 is the source screen. The PMC responded to the user's action by displaying four graphical portals on each display screen. For instance, the PMC displayed a first graphical portal 224 on the left edge of the display screen 208, a second graphical portal 226 on the top edge of the display screen 208, a third graphical portal 228 on the right edge of the display screen 208, and a fourth graphical portal 230 on the bottom edge of the display screen.

At the current time illustrated in FIG. 2, assume that the user has moved the graphical object 220 into the fourth graphical portal 230 at the bottom of the fourth display screen 208. The PMC responds by displaying a representation of the graphical object 220 in all four of each screen's graphical portals. The graphical portals in other display screens (besides the fourth display screen 208) are not labeled so as not to unduly complicate the drawing.

The user thereafter remains free to extract the graphical object 220 from any graphical portal shown in FIG. 2 on any display screen, including the graphical source portal 230. Upon doing so, the PMC removes all of the graphical portals in all of the display screens.

Figure 3:
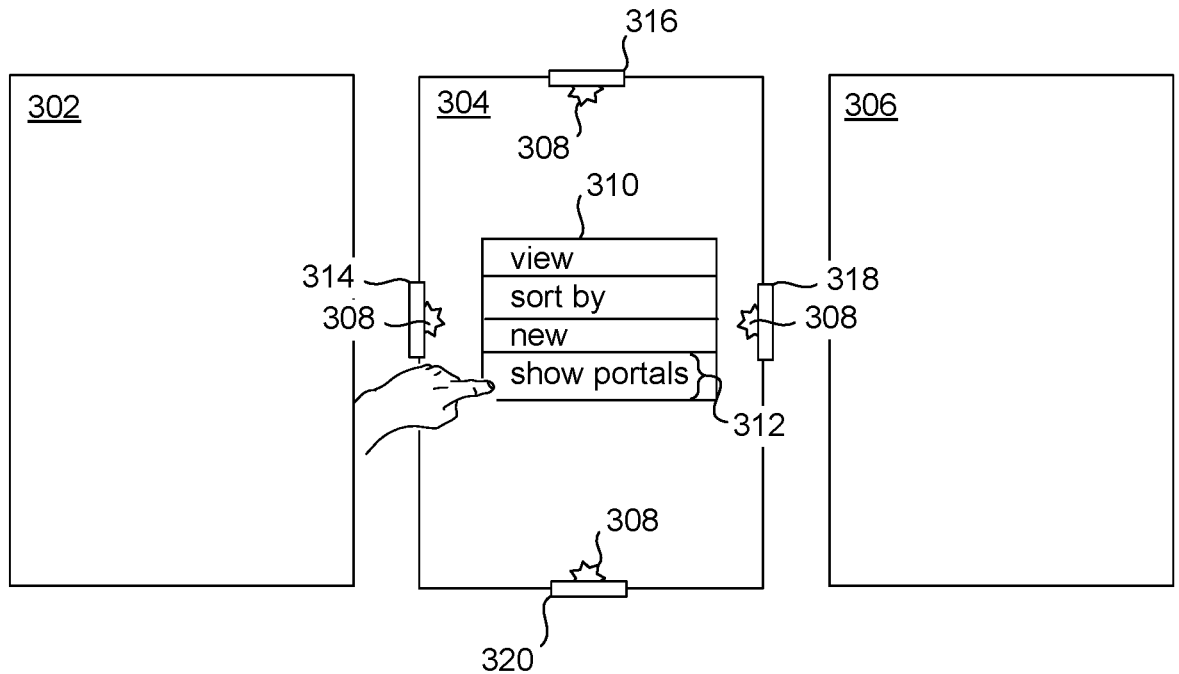
FIG. 3 depicts a user interface presentation through which a user may manually invoke the presentation of one or more graphical portals.

FIG. 3 shows an implementation that allows the user to drag a graphical object between display screens using graphical portals in the same manner as the scenarios of FIGS. 1 and 2. The implementation of FIG. 3 differs from the previously described implementations by displaying the graphical portals in an on-demand manner. That is, in FIGS. 1 and 2, the PMC shows a graphical object parked in every viable graphical portal on every viable display screen. In FIG. 3, to reduce display clutter, after the user moves a graphical object to a graphical portal, the PMC removes the graphical portals from all display screens (while still preserving the association of the graphical object with the portals). The PMC then relies on the user to selectively reactivate the graphical portals on a desired destination display screen.

More specifically, FIG. 3 shows three display screens (302, 304, 306) arranged in a row in the same manner of FIG. 1. Assume that at some prior point in time, the user has dragged a graphical object 308 across the first display screen 302. At that time, the PMC will have displayed one or more graphical portals on at least the first display screen 302 in the same manner set forth above for FIGS. 1 and 2. Assume that the user then dragged the graphical object 308 into one of the graphical portals on the first display screen 302. Then, unlike the case of FIGS. 1 and 2, the PMC removed the graphical portals from all of the display screens. But note that the graphical object 308 remains associated with all of the graphical portals on all display screens (302, 304, 306); the PMC just does not display a representation of the portals at this juncture.

Assume that the user now wishes to retrieve the graphical object 308 from the second display screen 304, corresponding to the desired destination screen. To do this, the user moves to the second display screen 304 and activates a control panel 310, e.g., by pressing on the display surface of the second display screen 304 for a prescribed amount of time. The user then activates a control option 312 ("show portals") in the control panel 310. In response, the PMC selectively displays four graphical portals (314, 316, 318, 320) in the second display screen 304 with the object 308 parked therein, but not in the first display screen 302 or the third display screen 306. Thereafter, the user may proceed to pull the graphical object 308 out of any of the graphical portals (314, 316, 318, 320) and drag it to a desired location within the second display screen 304 in the same manner described above for FIGS. 1 and 2.

Figure 4:
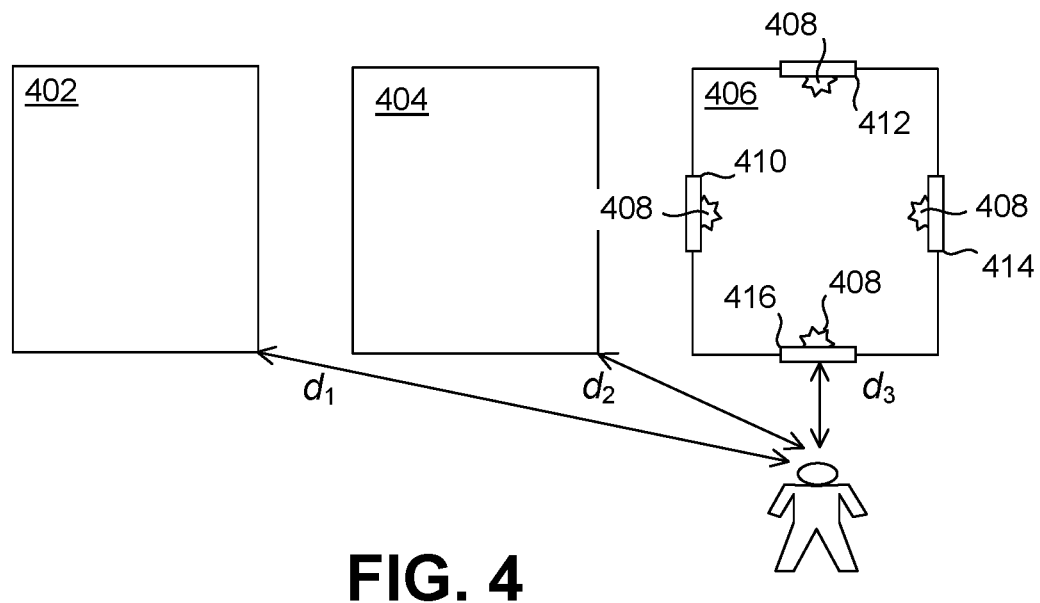
FIG. 4 shows a scenario in which the PMC selectively displays graphical portals on display screens in a manner that is dependent on the position of a user relative to the display screens.

FIG. 4 shows another implementation in which the user can reactivate the presentation of graphical portals on a desired destination screen. More specifically, FIG. 4 shows three display screens (402, 404, 406). Again assume that the user has previously parked a graphical object 408 in a graphical source portal in one of the display screens. The PMC then removed the presentation of the graphical portals (and all copies of the graphical object 408 parked therein) from all of the display screens (402, 404, 406).

Assume that the user now wishes to retrieve the graphical object 408 from the third display screen 406, corresponding to the desired destination screen. To do this, the user moves to within prescribed proximity to the third display screen 406. A sensor detects the user's presence and forwards a signal to the PMC. In response to this signal, the PMC selectively displays four graphical portals (410, 412, 414, 416) in the third display screen 406, but not in the first display screen 402 or the second display screen 404. Thereafter, the user may proceed to pull the graphical object 408 out of any of the graphical portals (410, 412, 414, 416) in the third display screen 406 and drag it to a desired location in the same manner described above for FIGS. 1 and 2.

Figure 5:
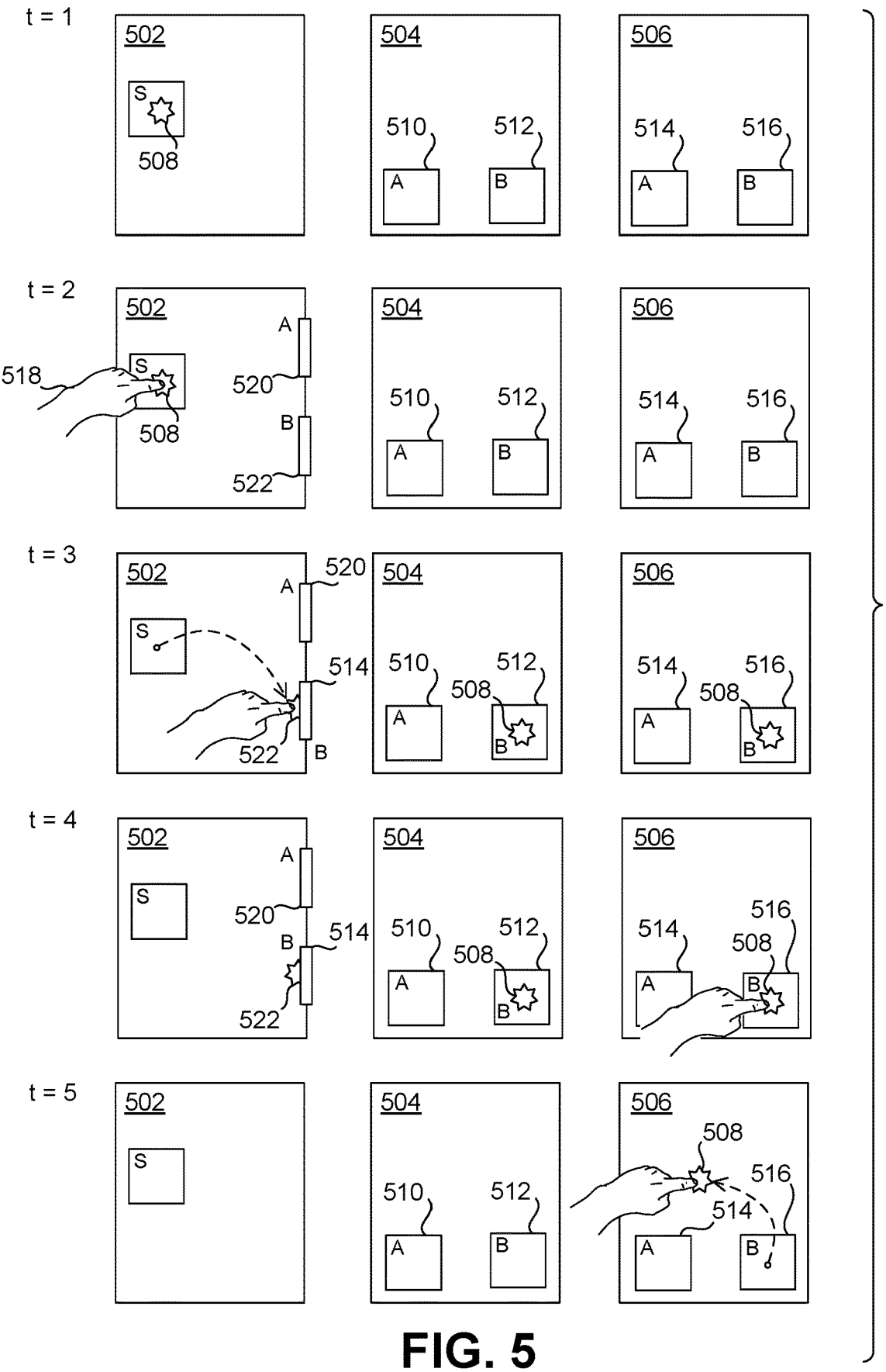
FIG. 5 shows yet another example of the operation of the PMC.

FIG. 5 shows yet another example of the operation of the PMC. The implementation of FIG. 5 differs from the example of FIG. 1 because it shows at least two kinds of graphical portals, a first kind of graphical portal associated with a target domain A, and a second kind of graphical portal associated with a target domain B. In some implementations, the domain A may correspond to a window provided by an application A, or some other application experience. The target domain B may correspond to a window provided by an application B, or some other application experience.

More specifically, FIG. 5 shows three display screens (502, 504, 506) arranged in a row in the same manner of FIG. 1. At time t=1, a source domain S in the first display screen 502 provides a graphical object 508. The second display screen 504 includes a domain A 510 and a domain B 512. Similarly, the third display screen 506 includes a domain A 514 and a domain B 516.

At time t=2, the user uses the finger of his or her hand 518 to commence a drag operation. In response, the PMC displays a first graphical portal 520 associated with the domain A, and a second graphical portal 522 associated with the domain B. The PMC can display any number of these domain-specific graphical portals. The PMC displays the graphical portals (520, 522) on the right edge of the first display screen 502, but the PMC can be configured to present the portals (520, 522) anywhere on the first display screen 502.

The PMC can also provide a graphical portal associated with each instance of domain A (510, 514) in the destination screens (504, 506), and a graphical portal associated with each instance of domain B (512, 516) in the destination screens (504, 506). For instance, a graphical portal associated with a domain may be graphically co-extensive with the entire domain. Or it may correspond to only part of the domain, such as graphical "hole" provided at the center of each domain. The PMC can label the graphical portal or not, depending on how it is configured. In the example of FIG. 5, the PMC has not labeled the graphical destination portals in second and third display screens (504, 506).

In one implementation, the PMC presents the graphical portals (520, 522) in in the source screen in response to determining that the display screens (504, 506) include active windows associated with applications A and B. More generally, the PMC can take inventory of the applications that are currently providing user interface experiences to any of the three screens, and then, upon the user's movement of a source object, present graphical portals associated with these identified applications.

In yet another example (not shown), the PMC dynamically opens application windows for applications A and B on at least the second and third display screens (504, 506) when the user begins dragging the graphical object 508. Each application window is associated with a graphical portal as described above. In this example, the PMC can open the windows for applications A and B based on any consideration, such as a prior configuration setting.

At time t=3, assume that the user drags the graphical object 508 into the second graphical portal 522 associated with the domain B. In response, the PMC shows a copy of the graphical object 508 in the graphical destination portals associated with the domain B in both the second display screen 504 and the third display screen 506. For example, the PMC can show the object 508 in the center (or at any other default position) of the application windows provided by the application B.

At time t=4, the user moves to the third display screen 506 to drag the graphical object 508 out of the destination portal associated with the domain B 516. When the user begins the drag operation, the PMC will remove the copy of the graphical object 508 from the second graphical portal 522 in the source screen and from all destinations portals associated with domain B (that is, in both the second display screen 504 and the third display screen 506). At time t=5, the user drags the graphical object 508 to the desired final destination and removes his or her finger from the surface of the third display device 506. In the case of FIG. 5, the user moves the graphical object 508 out of the domain B 516. But the user might alternatively move the graphical object 508 to another position within the domain B 516. In any case, this action terminates the drag operation.

Alternatively, or in addition, the PMC can persistently associate graphical portals on any screen. For example, two or more screens can include static graphical portals. They are static in the sense that their presence is not contingent on the user beginning or terminating a drag operation in the manner described above. The user may transfer graphical objects between screens via the static graphical portals in the same manner described above.

A.2. Illustrative Implementations of the PMC

Figure 6:
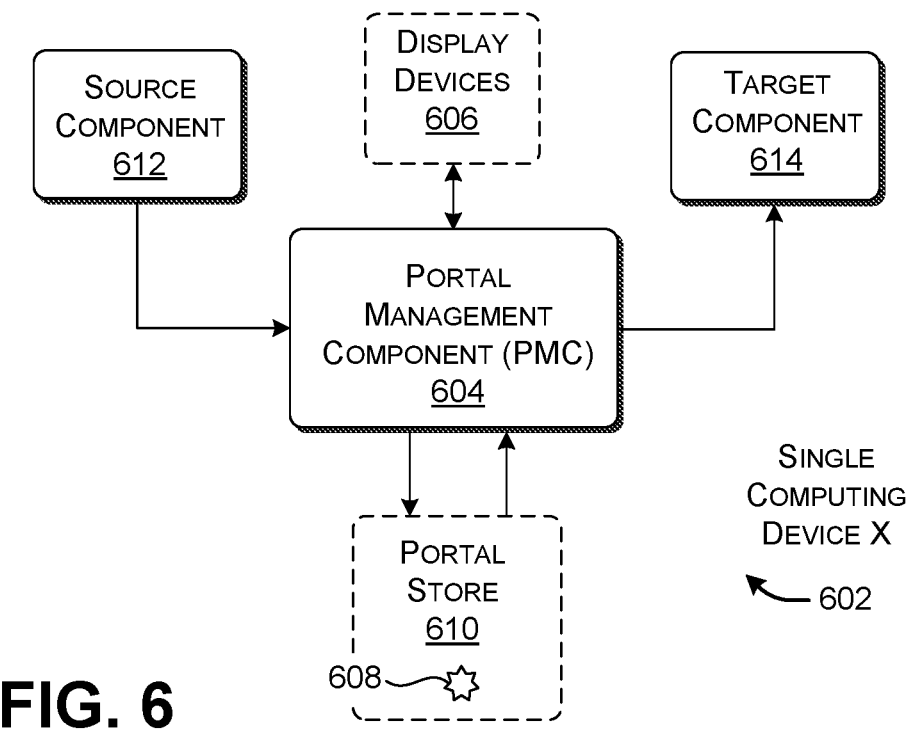
FIG. 6 shows one implementation of a computing device that includes the PMC.

FIG. 6 shows one implementation of a computing device 602 that includes a portal management component (PMC) 604. The computing device 602 can correspond to a workstation computing device, a laptop computing device, a tablet-type computing device, a game console, a smartphone (or other type of handheld computing device), a wearable computing device, a mixed-reality device, etc., or any combination thereof.

The PMC 604 governs the user's interaction with two or more display devices 606. That is, in the implementation of FIG. 6, a single control element (the PMC 604) controls the user interface presentations provided by all display devices 606.

In one implementation, an operating system of the computing device 602 implements the PMC 604. In another implementation, a remote computing device (or devices) implement the PMC 604; in that case, the computing device 602 interacts with the PMC 604 via a computer network (not shown). In other implementations, a combination of local and remote computing devices implement the PMC 604.

The PMC 604 stores graphical objects (e.g., graphical object 608) in a portal store 610 on a temporary basis. For instance, as explained in the previous subsection, a user may move the graphical object 608 to a graphical source portal (as managed by the PMC 604) in a source screen; the user may thereafter remove the graphical object 608 from a graphical destination portal (as managed by the PMC 604) in a destination screen.

The PMC 604 interacts with at least one source component 612 and at least one target component 614. For instance, the source component 612 may correspond to a source application from which the graphical object 608 originates. Or the source component 612 may correspond to a software component of the operating system (such as the component of the operating system which provides the desktop presentation). Similarly, the target component 614 may correspond to a target application to which the user ultimately drags the graphical object 608. Or the target component 614 may correspond to a software component of the operating system (such as the component of the operating system which provides the desktop presentation). The computing device 602 can implement both the source component 612 and the target component 614. In another case, one or more of these components (612, 614) can be implemented by one or more remote computing devices, in whole or in part.

Section B sets forth a detailed signal diagram that describes one manner of operation of the computing device of FIG. 6. As a preview of that explanation, the source component 612 creates a data package when the user begins to drag the graphical object 608. It then forwards a movement-initiation signal to the PMC 604. The PMC 604 thereafter carries out the user experience described in Subsection A.1. That experience involves implementing the drag behavior on the source screen, displaying graphical portals, storing the graphical object, implementing the drag behavior on a destination screen, removing the graphical portals, etc. The PMC 604 sends a movement-termination signal to the source component 612 and/or the target component 614 when the user completes his or her drag. More generally, the PMC 604 may also send appropriate event signals to any target component when the user drags the graphical object 608 over its associated target domain on a destination screen. Interaction between applications and the PMC 604 can be performed in any manner, such as operating-system signaling, application programming interfaces (APIs), etc.

Figure 7:
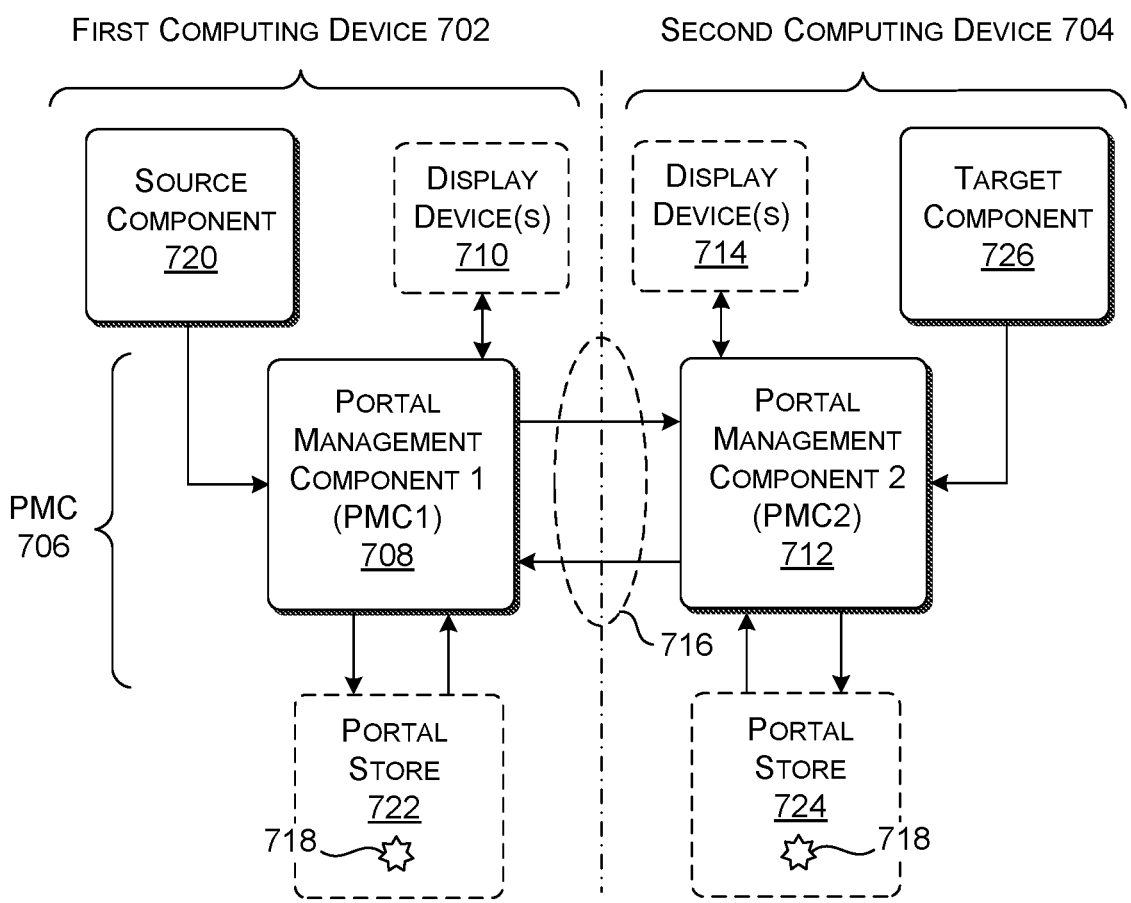
FIG. 7 shows an implementation of a computing system that includes plural PMC instances.

FIG. 7 shows an implementation that uses two or more computing devices (702, 704) to implement a PMC 706. This implementation, for instance, corresponds to the case in which the first computing device 702 uses its own PMC 708 to govern interaction with one or more display devices 710, and the second computing device 704 uses its own PMC 712 to govern interaction with one or more display devices 714. In other words, in this case, a single PMC provided by a single operating system no longer controls all display screens. The PMC 706 in this example corresponds to a higher-level component that represents two individual PMC instances (708, 712) working in cooperation.

To function in this manner, the first PMC 708 (of the first computing device 702) and the second PMC 712 (of the second computing device 704) exchange control instructions and data via a communication path 716. For example, the two PMCs (708, 712) can communicate via hardwired connection, via wireless connection (e.g., via WIFI communication), etc.

In some cases, the first computing device 702 and the second computing device 704 may be associated with the same user account. In other cases, the first computing device 702 and the second computing device 704 may be associated with two different respective users (and two different user accounts). For instance, in the latter scenario, a first user may place a graphical object 718 in a graphical portal of a source screen. A second user may retrieve the graphical object 718 from a graphical portal provided by a destination screen. The first user's computing device 702 controls the source screen, while the second computing device 704 controls the destination screen.

In operation, the first PMC 708 can receive the graphical object 718 from a source component 720 when a user begins a drag operation on a source screen. The first PMC 708 then executes all of the source-side behavior described in Subsection A.1. That behavior includes displaying source-side graphical portals, storing the graphical object in a portal store 722, etc. The first PMC 708 then notifies the second PMC 712 that a drag operation has commenced. The second PMC 712 then implements all destination-side behavior described in Subsection A1. That behavior includes displaying destination-side graphical portals, storing the graphical object in a portal store 724, and communicating with a target component 726.

Figure 8:
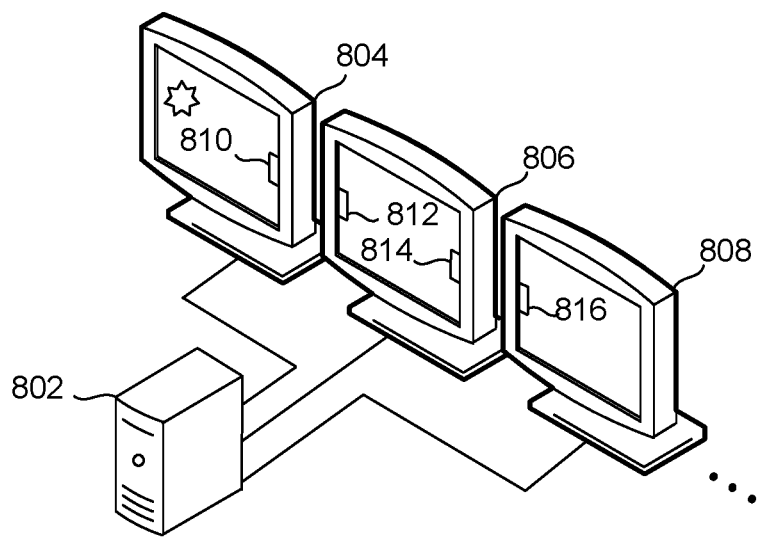
FIG. 8 shows a presentation environment for use with the PMC that includes three or more physical display monitors.

FIG. 8 shows a presentation environment that includes a single computing device 802 attached to any number of physical display monitors (804, 806, 808), each of which provides a display screen. The computing device 802 may provide an operating system which implements a PMC. That single PMC, in turn, governs the operation of all of the display monitors (804, 806, 808).

FIG. 8 shows that the display monitors (804, 806, 808) display a plurality of graphical portals (810, 812, 814, 816). (Further note that any single display monitor may host two or more display screens.) In this setup, the PMC provided by the computing device 802 may operate in the manner specified in FIG. 1 or FIG. 5 (for instance).

Figure 9:
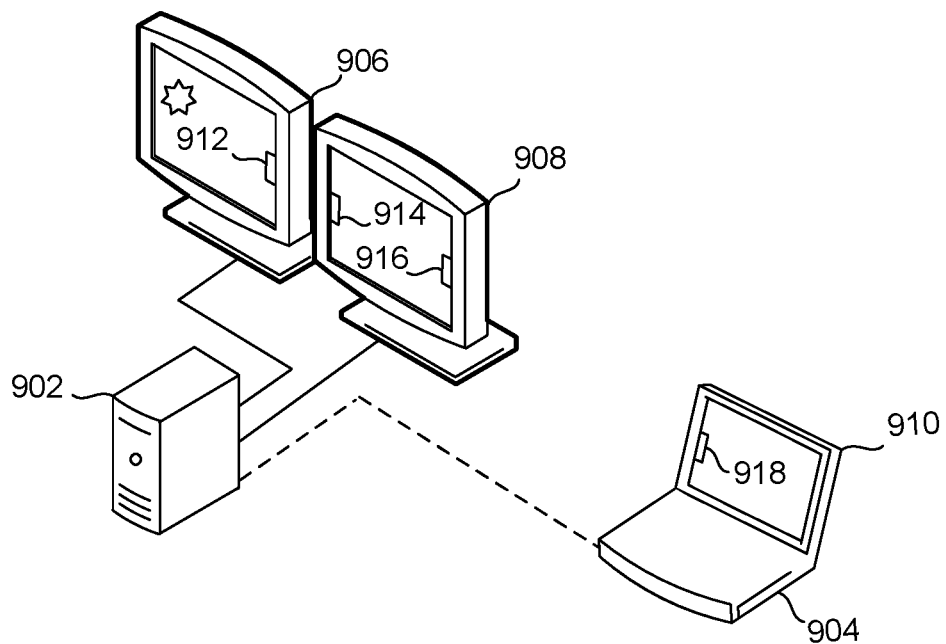
FIG. 9 shows a presentation environment for use with the PMC that includes two or more computing devices.

FIG. 9 shows a presentation environment that includes two computing devices (902, 904). More generally, a presentation environment can include any number of computing devices. The first computing device 902 is coupled to two physical display monitors (906, 908). In a first configuration (per the implementation of FIG. 6), a single PMC, provided by the first computing device 902, controls all aspects of the movement of graphical objects across display screens. That is, in this scenario, the first computing device 902 effectively treats a display device 910 of the second computing device 904 (here a laptop computing device) as another display monitor; the operating system of the second computing device 904 does not independently control any aspect of the drag behavior described in Subsection A.1.

In a second configuration (per the implementation of FIG. 7), the first computing device 902 implements a first PMC, and the second computing device 904 implements a second PMC; these two PMC instances constitute a higher-order PMC. The first PMC controls the first and second display monitors (906, 908), while the second PMC controls the display device 910 of the second computing device 904.

A user may establish the presentation environment shown in FIG. 9 in different ways. In a manual setup mode, a user (or users) may manually configure both the first computing device 902 and/or the second computing device 904 to operate in a desired configuration. For instance, the user of the first computing device 902 may manually configure its PMC to add the display device 910 of the second computing device 904 to the set of display monitors that it controls (per the configuration of FIG. 6). Or the users of the first and second computing devices (902, 904) may configure their respective PMCs to work together in the manner described above with respect to FIG. 7.

In an automatic setup mode, the first computing device 902 and the second computing device 904 may be configured to automatically invoke the object-passing capability described in Subsection A.1 when brought within a specified distance of each other (such as within 5 feet of each other in one non-limiting case). That is, in a first case, the first computing device 902 can take over the display device 910 of the second computing device 904, per the implementation of FIG. 6. In a second case, the first computing device 902 and the second computing device 904 can cooperate via respective PMCs, per the implementation of FIG. 7. (Note that the user(s) can provide a control setting which governs whether the mode of FIG. 6 is automatically invoked or the mode of FIG. 7 is automatically invoked.)

In yet another case, the first computing device 902 and the second computing device 904 may invoke the object-passing behavior of FIG. 1 only when: (1) they are brought within a specified distance of each other; and (2) a user performs a telltale gesture. For example, a first user of the first computing device 902 may perform the drag operation shown in FIG. 1 (at time t=2) using a multi-finger gesture (e.g., by using two fingers to drag the graphical object 108 instead of one). The PMC of the first computing device 902 will interpret this gesture as an instruction to establish a relationship with the second computing device 904 (per the case of FIG. 6 or the case of FIG. 7), if the second computing device 904 is within a prescribed proximity to the first computing device 902.

In another example, the first computing device 702 and the second computing device 704 can cooperate with each another in a context-specific manner depending on the graphical portal in which the user drops the graphical object in a source screen. For instance, consider a variation of the implementation of FIG. 5. Assume that the first and second display screens (502, 504) are controlled by the first computing device 902, while the third display screen 506 is controlled by the second computing device 904. Further assume that the second display screen 504 shows only a domain A (but not a domain B), while the third display screen 506 shows only a domain B (but not a domain A). Here, the first computing device 902 need only interact with the second computing device 904 when the user drops a graphical object in the graphical portal 514 for domain B.

Regardless of the manner in which the two computing devices (902, 904) are set up, FIG. 9 shows that the above-described display devices (906, 906, 908) display a plurality of graphical portals (912, 914, 916, 918). In this setup, the PMC (or PMCs) may operate in the manner specified in FIG. 1 or FIG. 5 (for instance).

Figure 10:
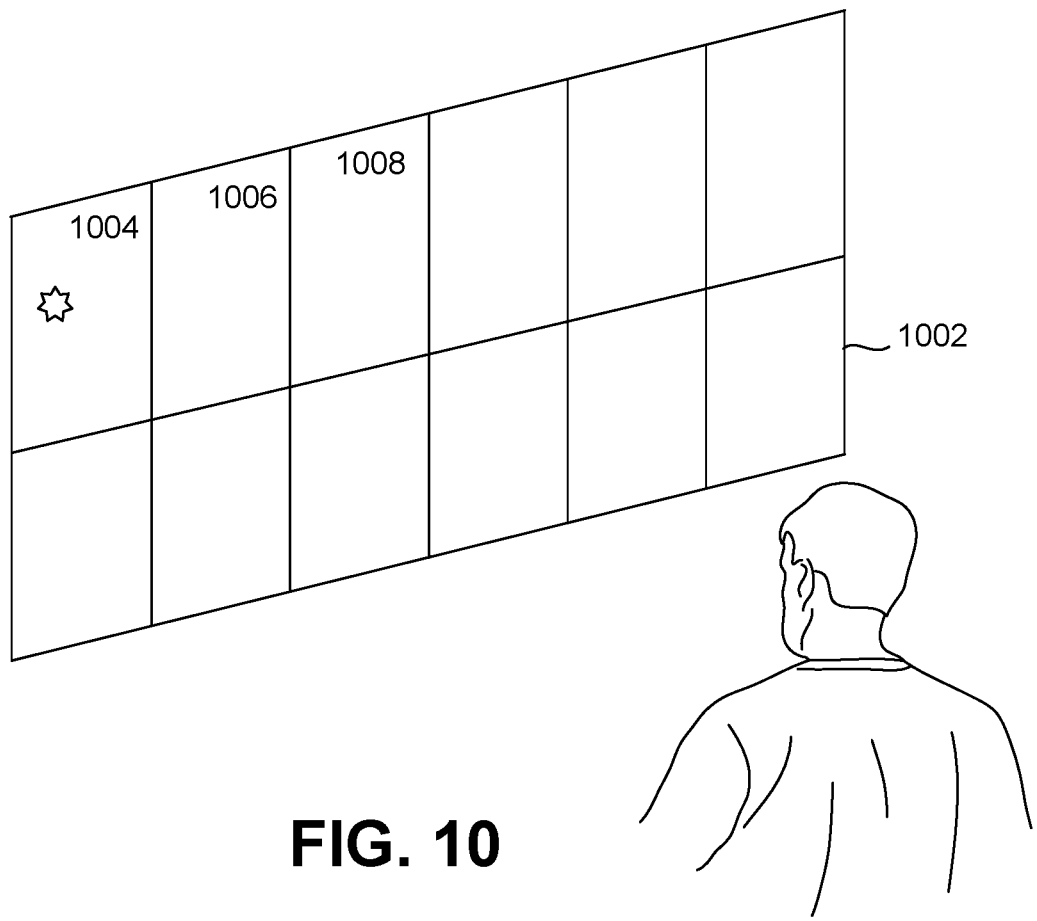
FIG. 10 shows a presentation environment for use with the PMC that includes a multi-panel display device.

FIG. 10 shows a presentation environment that includes a multi-panel display 1002, such as a wall display, a table display, etc. The multi-panel display 1002 includes plural display panels (1004, 1006, 1008 . . . ). More generally, the multi-panel display 1002 can include a dynamically expandable/contactable number of display panels. A small gap separates each adjacent display panel. While this gap is typically much smaller than the gap separating display devices in FIGS. 8 and 9, it may be large enough to disrupt a traditional drag operation that extends from one display panel to an adjacent display panel. The PMC described herein addresses this problem through its use of graphical portals (not shown in FIG. 10). One or more computing devices (not shown) may drive the multi-panel display 1002, in conjunction with one or more PMCs. In operation, the PMC(s) in this implementation may operate in the manner described in Subsection A.1 with respect to FIG. 2. Note that the PMC automatically adapts to each added display panel by duplicating the kind of behavior described above (e.g., with respect to FIG. 2) for each added display panel.

Figure 11:
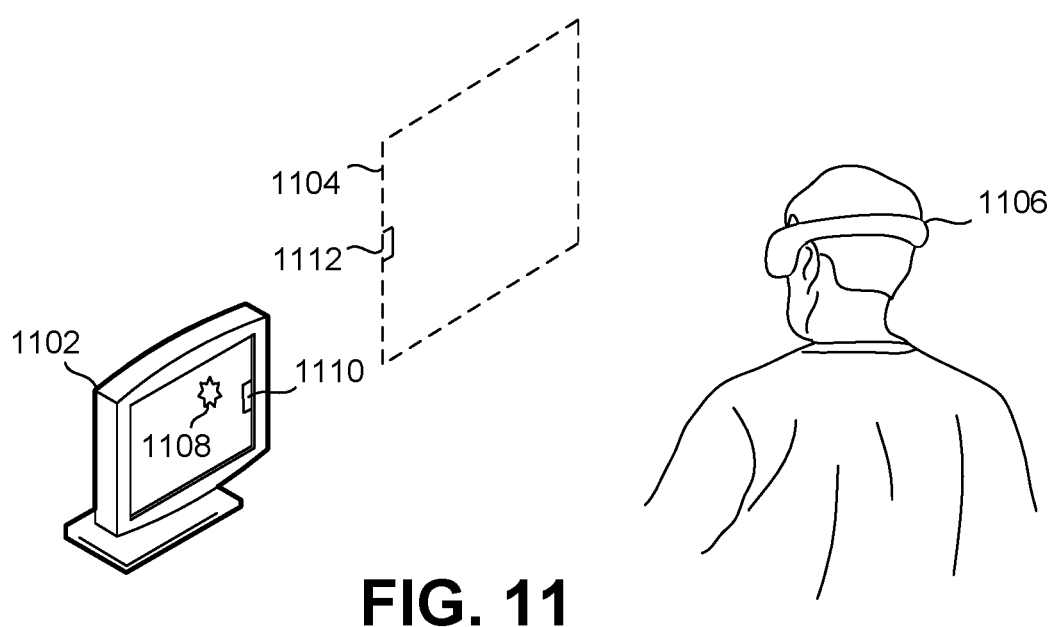
FIG. 11 shows a presentation environment for use with the PMC that includes a mixed-reality device.

FIG. 11 shows a presentation environment that includes a display monitor 1102 that is driven by a stationary computing device (not shown in FIG. 11). The presentation environment also includes a mixed-reality display 1104 driven by a mixed-reality device, such as a head-mounted display (HMD) 1106. In other implementations, the stationary computing device can also provide display information to one or more additional display monitors (although not shown). Likewise, the HMD 1106 can provide display information to one or more additional mixed-reality displays. The implementation shown in FIG. 11 can use the architecture of either FIG. 6 or FIG. 7, e.g., by leveraging a single PMC or two (or more) cooperating PMCs.

In one manner of operation, the user may move a graphical object 1108 into a first graphical portal 1110 on the physical display monitor 1102. The PMC(s) will respond by also placing a copy of the graphical object 1108 in a graphical portal 1112 of the mixed-reality display 1104. The user can then retrieve the graphical object 1108 from the graphical portal 1112 and manipulate it in mixed-reality space. The user can interact with the mixed-reality space in any manner, such as with hand gestures (e.g., pointing gestures), gaze gestures, voice commands, handheld controllers, etc. The user can alternatively perform the reverse movement, e.g., by moving a graphical object from the mixed-reality space to the physical display monitor 1102.

In another implementation (not shown), the PMC can interact with plural virtual desktop screens that a single computing device presents on the same physical display monitor. In this mode of operation, in interacting with a first display screen, a user can move a graphical object into a graphical portal (presented on the first display screen). The user may then switch to a virtual desktop presentation. That virtual desktop presentation will show a graphical portal including the graphical object parked therein. The user may then extract the graphical object out of the graphical portal to complete the drag operation.

Finally, the PMC also has utility in the context of the user's interaction with a single display screen. The user may move a graphical object into a graphical source portal on a source screen, perform various operation on the source screen (such as opening and/or closing windows), and then extract the graphical object from the same graphical source portal.

Figure 12:
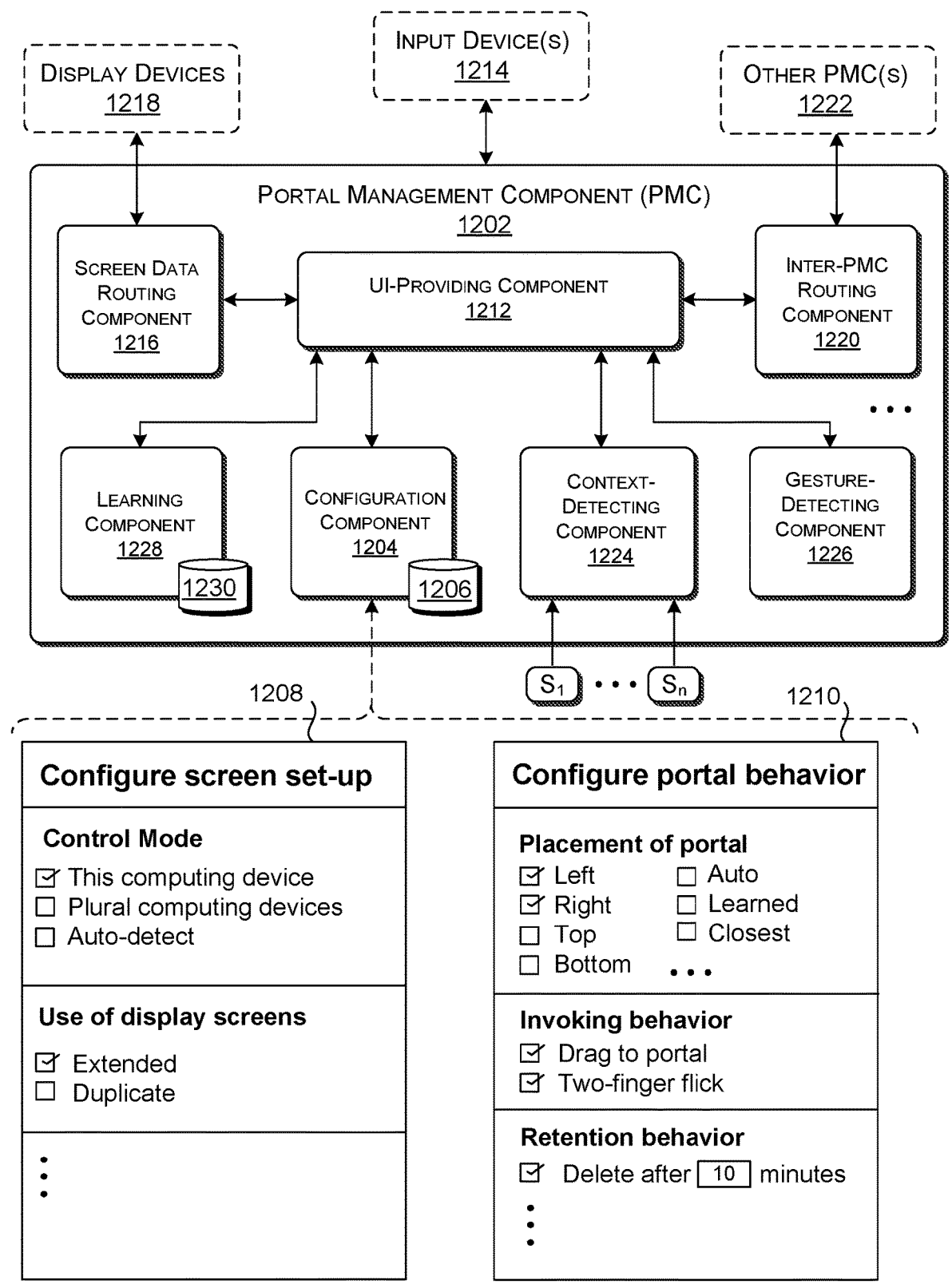
FIG. 12 shows one implementation of the PMC itself.

FIG. 12 shows one implementation of the portal management component (PMC) 1202 shown in FIG. 1, provided by a first computing device. The PMC 1202 includes a configuration component 1204 for soliciting control settings from the user which control the operation of the PMC 1202. The configuration component 1204 stores the control settings in a data store 1206.

The configuration component 1204 presents a first control panel 1208 to solicit control settings that govern whether the PMC 1202 operates in the mode shown in FIG. 6 (in which a single PMC 1202 controls the operation of plural display screens) or in the mode of FIG. 7 (in which two or more PMCs of plural computing devices cooperate in controlling plural display screens). In an "Auto" mode, the PMC 1202 automatically invokes the mode shown in FIG. 6 or FIG. 7 when a new display device is brought within a prescribed distance to the first computing device which implements the PMC 1202, e.g., when a user places a second computing device (which hosts a new display device) in prescribed proximity to the first computing device (which implements the PMC 1202).

The control panel 1208 also solicits control settings that govern the way in which the PMC 1202 presents information across the plural display screens. In one mode, the PMC 1202 uses the plural display screens to present a single extended user interface presentation (as shown in FIG. 1). In another mode, the PMC 1202 presents the same user interface presentation on each of the display screens. In another mode, the PMC 1202 (per the configuration of FIG. 7) allows a separate computing device to independently present display information on one or more display screens, e.g., as driven by that computing device's native PMC.

The configuration component 1202 receives control settings via another control panel 1210 pertaining to each display screen's use of graphical portals. These control settings include, but are not limited to: the location(s) at which the PMC 1202 places graphical portals on each display screen; the manner in which the PMC 1202 introduces the graphical portal(s) on the display screens; the manner in which the PMC 1202 removes the graphical portal(s) on the display screens, and so on.

In an "Auto" mode, the PMC 1202 determines the placement of each display screen relative to each other display screen. (The PMC 1202 makes this determination using the mechanism described below.) The PMC 1202 then provides a graphical portal (or portals) on any edge of a display screen that neighbors another display screen. For instance, in the setup of FIG. 1, the PMC 1202 will discover that the first display screen 102 sits to the left of second display screen 104, and that the second display screen 104 sits to the left of the third display screen 106. The PMC 1202 responds to this knowledge by showing graphical portals (112, 114, 116, 118) on neighboring edges.

A user interface (UI)-providing component 1212 interacts with the user via a user interface presentation across the plural display screens. This operation involves receiving input signals from a user via one or more input devices 1214 (including a touch input device, a pen input device, a mouse input device, etc.). This operation also involves presenting graphical display information to the display screens.

A screen-routing component 1216 sends display information to a set of display screens 1218 which the PMC 1202 directly controls (e.g., per the mode of FIG. 6). The PMC 1202 performs this function by partitioning display information provided by the UI-providing component 1212 into parts appropriate for presentation on separate respective display screens 1218, and then routing those parts to the appropriate display screens 1218. An inter-PMC routing component 1220 interacts with one or more other PMCs 1222 per the mode of FIG. 7, that is, when this mode is invoked.

A context-detecting component 1224 can determine the context in which the PMC 1202 is being used. For example, the context-detecting component 1224 can receive proximity signals from one or more device-detecting sensors. These proximity signals indicate when a new device is brought within a prescribed proximity to a first computing device which implements the PMC 1202. The device-detecting sensor(s) can include wireless sensors which detect electromagnetic beacon signals emitted by the new device, acoustic sensors which detect sound signal emitted by the new device, and so on. The context-detecting component 1224 can determine the proximity of a new device to the first computing device based on the magnitude of the received proximity signals. The context-detecting component 1224 can determine a placement of a new device relative to the first computing device based on the relative strengths of proximity signals received from plural device-detecting sensors.

The context-detecting component 1224 can derive the placement of display screens relative to each other based on knowledge of the position of each display screen relative to the first computing device. Alternatively, in some implementations, each display screen can include proximity sensors and/or signal emitters. Using this equipment, any display screen A can provide a proximity signal based on a signal emitted by a display screen B. The context-detecting component 1224 can collect these proximity signals to reconstruct the placement of each display screen relative to each other display screen.

Finally, the context-detecting component 1224 can determine the position of the user relative to each display screen (e.g., for use in the implementation of FIG. 4). The context-detecting component 1224 can perform this task based on one or more sensors associated with each display device, such as optical sensors (e.g., infrared sensors), video sensors, acoustic sensors, floor weight sensors (which detect where the user is standing), etc.

A gesture-detecting component 1226 analyzes input signals from the input devices 1214 to determine whether the user has performed a telltale gesture, such as a drag gesture. The gesture-detecting component 1226 can use known technology to perform this task, e.g., by comparing the input signals against known patterns using discrete algorithms, or by using machine-trained models (e.g., Hidden Markov Models). In the case of a drag gesture, the gesture-detecting component 1226 can determine whether the received input signals indicate that the user is applying a continuous point of contact with a graphical object on a display screen while moving that point of contact across the display screen.

A learning component 1228 can determine the habits of the user in interacting with computing devices. For instance, the learning component 1228 can determine the frequency at which the user commences a drag operation from different display screens. Likewise, the learning component 1228 can determine the frequency with which the user extracts graphical objects from graphical portals on different display screens. The learning component stores this usage information in a data store 1230. The learning component 1228 can also detect and store information regarding the context of each drag action that is performed by the user, such as the time of day of a drag operation, the place of a drag operation, the nature of the graphical object that is dragged, and so on. The learning component 1228 can also capture and store more general information regarding the ways in which the user interacts with computing devices (not necessarily in connection with the user's drag-and-drop behavior), such as the ways in which the user manipulates a mouse device.

The learning component 1228 can summarize the user's behavior in different ways. For example, the learning component 1228 can generate a table that counts the number of times that the user performs different actions in specified contexts. In another example, the learning component 1228 generates a machine-trained model that is able to detect patterns in the user's drag-related behavior.

In addition, or alternatively, the learning component 1228 can capture information regarding the usage patterns of a general population of users. Or the learning component 1228 can capture information regarding the usage patterns of different groups of people, with the members of each group sharing one or more characteristics.

In one mode of operation, the PMC 1202 uses the user behavior information provided by the learning component to selectively present graphical portals on certain display screens and not others. For example, assume that the learning component 1228 determines that the user commonly retrieves graphical objects from a display panel X in a multi-panel wall display, particularly in the morning hours of a workweek. In response, when the user next moves a graphical object into a graphical source portal, the PMC 1202 can present a graphical destination portal on just the display panel X. This has the advantage of not unduly cluttering the wall display with many graphical portals (per the implementation of FIG. 2). The PMC 1202 can still allow the user to retrieve the graphical object from any display panel in an on-demand manner, e.g., through the use of the control panel 310 shown in FIG. 3 or a like mechanism.

B. Illustrative Processes

FIGS. 13-19 show processes that explain the operation of the portal management component (PMC) of Section A in flowchart form. Since the principles underlying the operation of the PMC have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

Figure 13:
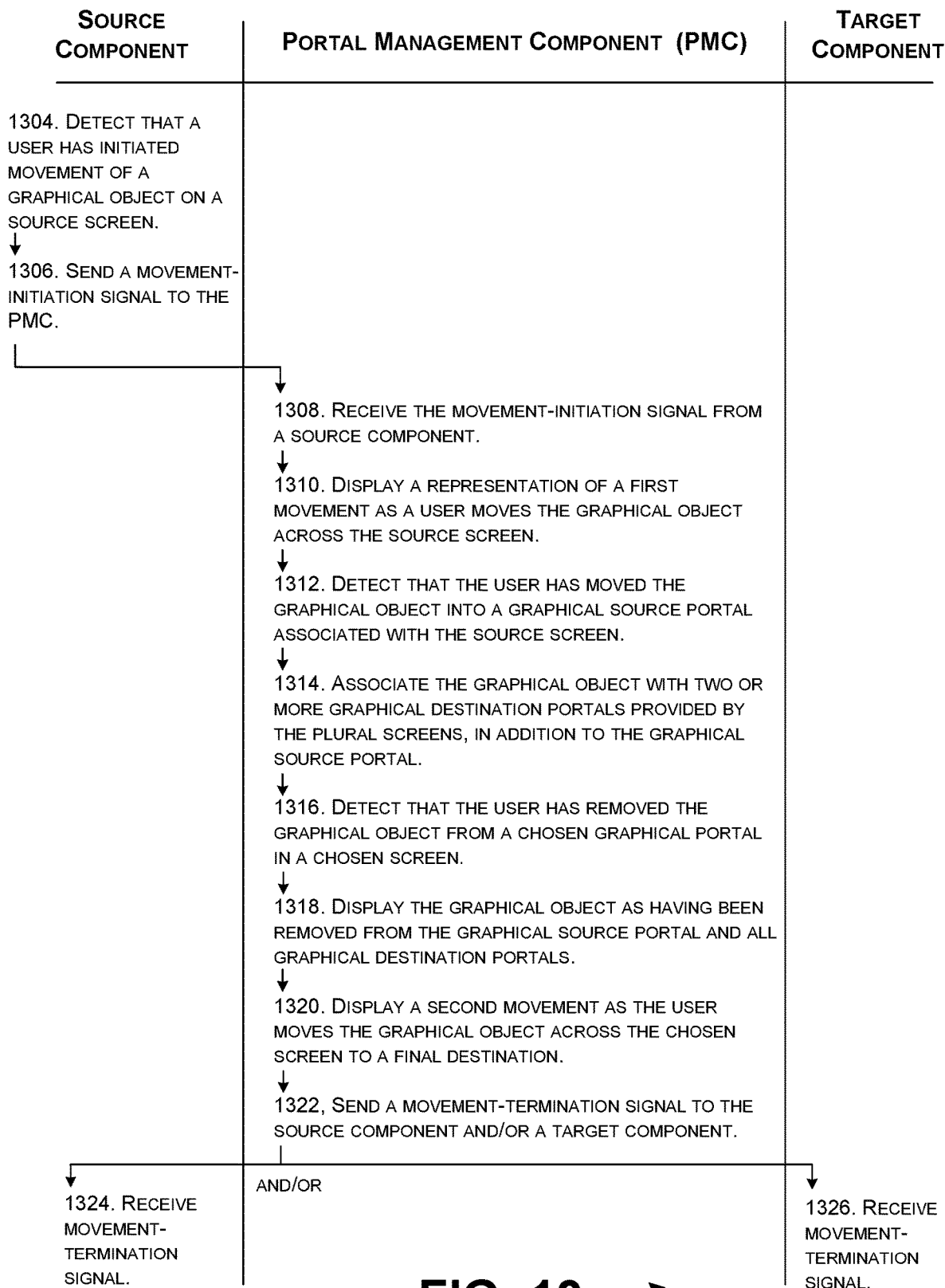
FIG. 13 shows a process for facilitating movement of a graphical object across separate screens through the use of graphical portals.

FIG. 13 describes a process 1302 for facilitating interaction with plural display screens. In block 1304, a source component detects that a user has initiated movement of a graphical object on a source screen. In block 1306, the source component sends a movement-initiation signal to the PMC. In block 1308 the PMC receives the movement-initiation signal from the source component that indicates that a user has commenced a movement operation on a graphical object. In block 1310, the PMC displays a representation of a first movement as a user moves a graphical object across the source screen. In block 1312, the PMC detects that the user has moved the graphical object into the graphical source portal associated with the source screen. In block 1314, the PMC associates the graphical object with two or more graphical destination portals provided by the plural display screens, in addition to the graphical source portal. The graphical object is accessible from the graphical source portal and any graphical destination portal. The plural display screens includes the source screen and two or more destination screens. In block 1316, the PMC detects that the user has removed the graphical object from a chosen graphical portal in a chosen screen. In block 1318, the PMC displays the graphical object as having been removed from the graphical source portal and all graphical destination portals. In block 1320, the PMC displays a second movement as the user moves the graphical object across the chosen screen to a final destination. In block 1322, the PMC sends a movement-termination signal to the source component and/or a target component, the movement-termination signal indicating that a movement of the graphical object has terminated, the target component being associated with the final destination. In blocks 1324 and 1326, the source component and/or the target component receive the movement-termination signal.

Other implementations can allocate tasks between the source component, the PMC, and the target component in different ways compared to that illustrated in FIG. 13. For instance, the source component can handle the drag of a source object to a graphical source portal. At that time, the source component can make an application programming interface (API) call to the PMC, asking it to store a copy of the graphical object in its portal store. Insofar as a source component (or any other component) performs a function attributed to the PMC above, that functionality is considered a part of the PMC.

FIG. 14 shows a process 1402 for selectively displaying the graphical object in at least one, but not all, of the graphical portals. In block 1404, the PMC receives an instruction from the user to selectively retrieve the graphical object from the chosen screen. In block 1404, in response to the instruction, the PMC selectively displays the graphical object as positionally coupled to one or more graphical portals associated with the chosen screen.

FIG. 15 shows another process 1502 for selectively displaying the graphical object in at least one, but not all, of the graphical portals. In block 1504, the PMC determines a location of the user with respect to each of the plural display screens. In block 1506, the PMC selectively displays the graphical object as positionally coupled to one or more graphical portals in a conditional manner, based on the location of the user relative to each of the plural display screens.

FIG. 16 shows another process 1602 for selectively displaying the graphical object in at least one, but not all, of the graphical portals. In block 1604, the PMC determines a preferred graphical portal from which the user has retrieved graphical objects on two or more prior occasions. In block 1606, the PMC selectively displays the graphical object as positionally coupled to the preferred graphical portal.

FIG. 17 shows a process 1702 for automatically invoking aspects of the process 1302 of FIG. 13. In block 1704, the PMC detects that the user has moved at least two display screens within a prescribed physical proximity to each other. In block 1706, the PMC invokes a screen-sharing mode between the two display screens in response to block 1704.

FIG. 18 shows another process 1802 for automatically invoking aspects of the process 1302 of FIG. 13. In block 1804, the PMC determines that the user has performed a telltale gesture to initiate the first movement, the telltale gesture being associated with a screen-to-screen movement operation. In block 1806, the PMC invokes a screen-sharing mode between at least two display screens in response to determining that the user has performed the telltale gesture.

FIG. 19 shows a process 1902 for configuring the PMC. In block 1904, the PMC provides a configuration interface to the user. In block 1906, the PMC receives configuration information from the user via the configuration interface. The configuration information governs: a positional placement of each graphical portal on each of the plural display screens, and/or a behavior of each graphical portal.

C. Representative Computing Functionality

Figure 20:
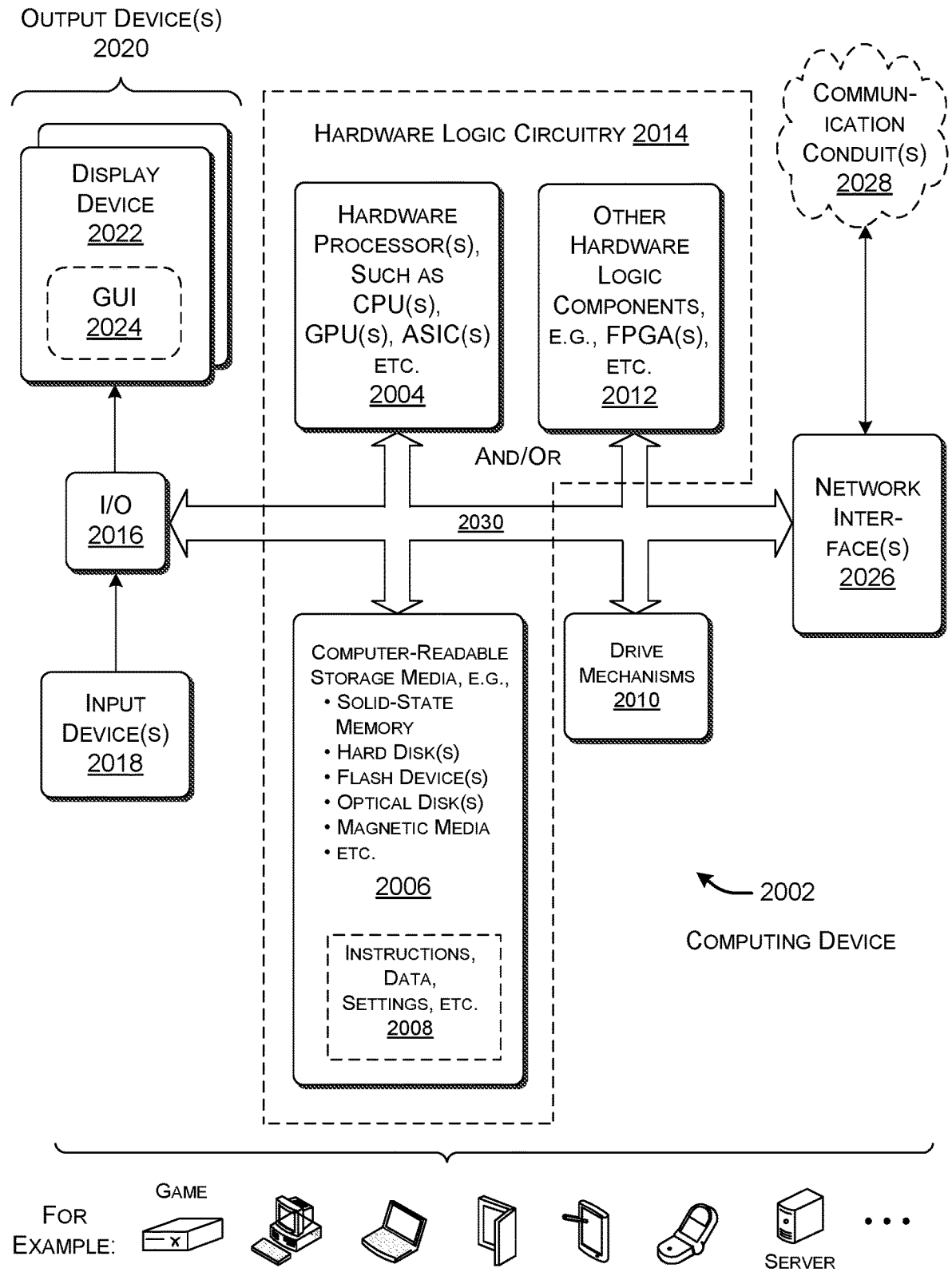
FIG. 20 shows an illustrative type of computing device that can be used to implement any aspect of the features shown in the foregoing drawings.

FIG. 20 shows a computing device 2002 that can be used to implement any aspect of the mechanisms set forth in the above-described figures. For instance, the type of computing device 2002 shown in FIG. 20 can be used to implement any computing device shown in FIGS. 6-11. In all cases, the computing device 2002 represents a physical and tangible processing mechanism.

The computing device 2002 can include one or more hardware processors 2004. The hardware processor(s) 2004 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 2002 can also include computer-readable storage media 2006, corresponding to one or more computer-readable media hardware units. The computer-readable storage media 2006 retains any kind of information 2008, such as machine-readable instructions, settings, data, etc. Without limitation, for instance, the computer-readable storage media 2006 may include one or more solid-state devices, one or more magnetic hard disks, one or more optical disks, magnetic tape, and so on. Any instance of the computer-readable storage media 2006 can use any technology for storing and retrieving information. Further, any instance of the computer-readable storage media 2006 may represent a fixed or removable component of the computing device 2002. Further, any instance of the computer-readable storage media 2006 may provide volatile or non-volatile retention of information.

The computing device 2002 can utilize any instance of the computer-readable storage media 2006 in different ways. For example, any instance of the computer-readable storage media 2006 may represent a hardware memory unit (such as Random Access Memory (RAM)) for storing transient information during execution of a program by the computing device 2002, and/or a hardware storage unit (such as a hard disk) for retaining/archiving information on a more permanent basis. In the latter case, the computing device 2002 also includes one or more drive mechanisms 2010 (such as a hard drive mechanism) for storing and retrieving information from an instance of the computer-readable storage media 2006.

The computing device 2002 may perform any of the functions described above when the hardware processor(s) 2004 carry out computer-readable instructions stored in any instance of the computer-readable storage media 2006. For instance, the computing device 2002 may carry out computer-readable instructions to perform each block of the processes described in Section B.

Alternatively, or in addition, the computing device 2002 may rely on one or more other hardware logic components 2012 to perform operations using a task-specific collection of logic gates. For instance, the hardware logic component(s) 2012 may include a fixed configuration of hardware logic gates, e.g., that are created and set at the time of manufacture, and thereafter unalterable. Alternatively, or in addition, the other hardware logic component(s) 2012 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 20 generally indicates that hardware logic circuitry 2014 corresponds to any combination of the hardware processor(s) 2004, the computer-readable storage media 2006, and/or the other hardware logic component(s) 2012. That is, the computing device 2002 can employ any combination of the hardware processor(s) 2004 that execute machine-readable instructions provided in the computer-readable storage media 2006, and/or one or more other hardware logic component(s) 2012 that perform operations using a fixed and/or programmable collection of hardware logic gates.

In some cases (e.g., in the case in which the computing device 2002 represents a user computing device), the computing device 2002 also includes an input/output interface 2016 for receiving various inputs (via input devices 2018), and for providing various outputs (via output devices 2020). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 2022 and an associated graphical user interface presentation (GUI) 2024. The display device 2022 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 2002 can also include one or more network interfaces 2026 for exchanging data with other devices via one or more communication conduits 2028. One or more communication buses 2030 communicatively couple the above-described components together.

The communication conduit(s) 2028 can be implemented in any manner, e.g., by a local area computer network, a wide area computer network (e.g., the Internet), point-to-point connections, etc., or any combination thereof. The communication conduit(s) 2028 can include any combination of hardwired links, wireless links, routers, gateway functionality, name servers, etc., governed by any protocol or combination of protocols.

FIG. 20 shows the computing device 2002 as being composed of a discrete collection of separate units. In some cases, the collection of units may correspond to discrete hardware units provided in a computing device chassis having any form factor. FIG. 20 shows illustrative form factors in its bottom portion. In other cases, the computing device 2002 can include a hardware logic component that integrates the functions of two or more of the units shown in FIG. 1. For instance, the computing device 2002 can include a system on a chip (SoC or SOC), corresponding to an integrated circuit that combines the functions of two or more of the units shown in FIG. 20.

The following summary provides a non-exhaustive set of illustrative aspects of the technology set forth herein.

According to a first aspect, one or more computing devices for facilitating interaction with plural display screens are described. The computing device(s) include hardware logic circuitry, the hardware logic circuitry corresponding to: (a) one or more hardware processors that perform operations by executing machine-readable instructions stored in a memory, and/or (b) one or more other hardware logic components that perform operations using a task-specific collection of logic gates. The operations include: displaying a representation of a first movement as a user moves a graphical object across a source screen; detecting that the user has moved the graphical object into a graphical source portal associated with the source screen; associating the graphical object with two or more graphical destination portals provided by the plural display screens, in addition to the graphical source portal, the graphical object being accessible from the graphical source portal and any graphical destination portal; detecting that the user has removed the graphical object from a chosen graphical portal in a chosen screen; displaying the graphical object as having been removed from the graphical source portal and all graphical destination portals; and displaying a second movement as the user moves the graphical object across the chosen screen to a final destination.

According to a second aspect, the graphical source portal includes at least a first-domain graphical source portal and a second-domain graphical source portal. The plural display screens include at least one first-domain graphical destination portal and at least one second-domain graphical destination portal. The placement of the graphical object in the first-domain graphical source portal causes the graphical object to be selectively associated with each first-domain graphical destination portal, and placement of the graphical object in the second-domain graphical source portal causes the graphical object to be selectively associated with each second-domain graphical destination portal.

According to a third aspect (dependent on the second aspect), each first-domain graphical destination portal is positionally associated with a first-domain window, and each second-domain graphical destination portal is positionally associated with a second-domain window.

According to a fourth aspect, two or more of the plural display screens are associated with two or more respective physical display monitors controlled by a single computing device.

According to a fifth aspect, two or more of the plural display screens are associated with two or more respective panels that belong to a multi-panel display.

According to a sixth aspect, two or more of the plural display screens are associated with two or more respective computing devices.

According to a seventh aspect, one or more of the plural display screens are associated with one or more respective virtual desktops.

According to an eighth aspect, one or more the plural display screens are associated with one or more respective displays produced by one or more mixed-reality devices.

According to a ninth aspect, for one or more of the plural display screens, each individual screen includes two or more graphical portals located in two or more respective regions of the individual screen.

According to a tenth aspect, for one or more of the plural display screens, each individual screen includes at least one graphical portal that is positionally associated with an edge of the individual screen.

According to an eleventh aspect, the operations further include, in response to the associating operation, displaying the graphical object as being positionally coupled to the graphical source portal and each of the aforementioned two or more graphical destination portals.

According to a twelfth aspect, the operations further include, following the displaying of the second movement, sending a movement-termination signal to a source component and/or a target component, the movement-termination signal indicating that a movement of the graphical object has terminated, the source component being associated with a location from which the user obtained the graphical object, and the target component being associated with the final destination.

According to a thirteenth aspect, the operations further include, following the associating operation: receiving an instruction from the user to selectively retrieve the graphical object from the chosen screen; and in response to the instruction, selectively displaying the graphical object as positionally coupled to one or more graphical portals associated with the chosen screen.

According to a fourteenth aspect, the operations further include, following the associating operation: determining a preferred graphical portal from which the user has retrieved graphical objects on two or more prior occasions; and selectively displaying the graphical object as positionally coupled to the preferred graphical portal.

According to a fifteenth aspect, the operations further include: detecting that the user has moved at least two display screens within a prescribed physical proximity to each other; and invoking a screen-sharing mode between the aforementioned at least two display screens in response to detecting that the user has moved those display screens.

According to a sixteenth aspect, the operations further include: determining that the user has performed a telltale gesture to initiate the first movement, the telltale gesture being associated with a screen-to-screen movement operation; and invoking a screen-sharing mode between at least two display screens in response to determining that the user has performed the telltale gesture.

According to a seventeenth aspect, the operations further include: providing a configuration interface to the user; and receiving configuration information from the user via the configuration interface. The configuration information governs: a positional placement of each graphical portal on each of the plural display screens, and/or a behavior of each graphical portal.

According to an eighteenth aspect, a method is described, implemented by one or more computing devices, for facilitating interaction with plural display screens. The method includes: receiving a movement-initiation signal from a source component that indicates that a user has commenced a movement operation on a graphical object; displaying a representation of a first movement as a user moves the graphical object across a source screen; detecting that the user has moved the graphical object into a graphical source portal associated with the source screen; and associating the graphical object with two or more graphical destination portals provided by the plural display screens, in addition to the graphical source portal. The graphical object is accessible from the graphical source portal and any graphical destination portal. Further, the plural display screens include the source screen and two or more destination screens. The method further includes: detecting that the user has removed the graphical object from a chosen graphical portal in a chosen screen; displaying the graphical object as having been removed from the graphical source portal and all graphical destination portals; displaying a second movement as the user moves the graphical object across the chosen screen to a final destination; and sending a movement-termination signal to the source component and/or a target component, the movement-termination signal indicating that a movement of the graphical object has terminated, the target component being associated with the final destination.

According to a nineteenth aspect, the method further includes, in response to the associating operation, displaying the graphical object as being positionally coupled to the graphical source portal and each of the two or more graphical destination portals.

According to a twentieth aspect, a computer-readable storage medium is described for storing computer-readable instructions. The computer-readable instructions, when executed by one or more hardware processors, perform a method that includes, in response to movement by a user of a graphical object into a graphical source portal on a source screen, displaying the graphical object as being positionally coupled to two or more graphical destination portals provided by plural display screens, in addition to the graphical source portal. The graphical object is accessible from the graphical source portal and any graphical destination portal. The method further includes: detecting that the user has removed the graphical object from a chosen graphical portal in a chosen screen; displaying the graphical object as having been removed from the graphical source portal and all graphical destination portals; and displaying a second movement as the user moves the graphical object across the chosen screen to a final destination. A movement operation is paused but not terminated when the user moves the graphical object to the graphical source portal.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices for facilitating interaction with plural display screens, comprising:
   hardware logic circuitry, the hardware logic circuitry including: (a) one or more hardware processors that perform operations by executing machine-readable instructions stored in a memory, and/or (b) one or more other hardware logic components that perform the operations using a task-specific collection of logic gates, the operations including:
   determining that a user has commenced a drag operation by touching a graphical object in a source domain on a source screen, the source screen being one of the plural display screens,
   the source domain being provided by a source component, the source component being an application or a software component of an operating system in said one or more computing devices;
   displaying a representation of a first movement as the user moves the graphical object across the source screen;
   detecting that the user has moved the graphical object into a graphical source portal provided by the source screen, the graphical source portal being presented in response to a determination that the user has commenced the drag operation;
   in response to the movement of the graphical object into the graphical source portal, associating the graphical object with the graphical source portal on the source screen and two or more graphical destination portals provided by two or more destination screens, said two or more destination screens being two or more screens of the plural display screens, wherein upon said associating, at least part of the graphical object is simultaneously presented in the source portal and each of said two or more graphical destination portals, the hardware logic circuitry being configured to suspend but not terminate the drag operation when the user moves the graphical object into the graphical source portal, the hardware logic circuitry being configured to represent the drag operation as being suspended but not terminated when the user moves the graphical object into the graphical source portal,
   the graphical object being accessible from the graphical source portal and each of said two or more graphical destination portals;
   detecting that the user has removed the graphical object from a chosen graphical destination portal in a chosen destination screen, the chosen graphical destination portal being selected from among said two or more graphical destination portals, the chosen destination screen being one of said two or more destination screens that is different from the source screen;
   in response to detecting that the user has removed the graphical object from the chosen graphical destination portal, disassociating the graphical object from the graphical source portal and each of said two or more graphical destination portals;
   displaying a second movement as the user moves the graphical object across the chosen destination screen to a final destination, the final destination located within a target domain provided by the chosen destination screen,
   detecting that the user has removed his or her touch of the graphical object at the final destination, and, in response to said detecting that the user has removed his or her touch, determining that the user has terminated the drag operation that commenced when the user first touched the graphical object in the source domain; and
   sending a movement-termination signal to the source component, the movement-termination signal indicating that the drag operation has terminated,
   the hardware logic circuitry including instructions that represent the first movement and the second movement as parts of a same drag operation, and
   wherein the plural display screens are arranged in an array that includes at least one pair of positionally neighboring display screens.

2. The one or more computing devices of claim 1, wherein two or more of the plural display screens are two or more respective physical display monitors attached to a single computing device.

3. The one or more computing devices of claim 1, wherein each individual display screen of one or more of the plural display screens includes at least one graphical portal that is located on an edge of the individual screen, wherein said at least one graphical portal does not extend an entire span of the edge, and wherein said at least one graphical portal is not co-extensive with the individual display screen.

4. The one or more computing devices of claim 1, wherein the operations further comprise:

removing display of the graphical object in the source portal and in said two or more graphical destination portals;

receiving an instruction from the user to selectively retrieve the graphical object from the chosen destination screen; and in response to the instruction, selectively displaying the graphical object as positionally coupled to one or more graphical portals provided by the chosen destination screen, the hardware logic circuitry being configured to perform said selectively displaying only with respect to the chosen destination screen.

5. The one or more computing devices of claim 4, wherein the instruction is received in response to interaction by a user with a control panel presented on the chosen destination screen.

6. The one or more computing devices of claim 1, wherein the operations further comprise:

removing display of the graphical object in the graphical source portal and in said two or more graphical destination portals;

determining a preferred graphical portal, the preferred graphical portal provided by the chosen destination screen; and selectively displaying the graphical object as positionally coupled to the preferred graphical portal, without displaying the graphical object coupled to graphical portals other than the preferred graphical portal, the preferred graphical portal being identified by determining a frequency with which the user has removed graphical objects from graphical portals on different display screens.

7. The one or more computing devices of claim 1, wherein the operations further comprise:

providing a configuration interface to the user; and receiving configuration information from the user via the configuration interface, the configuration information determining a location at which at least one graphical portal is to be placed on at least one display screen of the plural display screens.

8. The one or more computing devices of claim 1, wherein the graphical source portal presented on the source screen is positionally adjacent to a neighboring graphical destination portal presented on a neighboring display screen, the neighboring display screen being immediately adjacent to the source screen, the neighboring graphical destination portal being one of said two or more graphical destination portals, wherein the operations further include displaying the graphical object in the graphical source portal such that the graphical object extends from the graphical source portal into the neighboring graphical destination portal, part of the graphical object being presented in the graphical source portal, and a different part of the graphical object being presented in the neighboring graphical destination portal.

9. The one or more computing devices of claim 1, wherein two or more of the plural display screens are respective panels that belong to a multi-panel display, and wherein a pair of neighboring display screens in said two or more panels includes a pair of positionally-adjacent graphical portals controlled by a single computing device.

10. The one or more computing devices of claim 1, wherein each individual display screen of one or more of the plural display screens has four sides, with a graphical portal located on each of the four sides, to overall provide four graphical portals that are non-contiguous with each other.

11. The one or more computing devices of claim 1, wherein at least one of the plural display screens includes a particular display screen provided by a display monitor, the particular display screen provided by the display monitor including one or more graphical portals for receiving the graphical object, wherein at least one of the plural display screens also includes a mixed-reality display screen provided by a mixed-reality device, the mixed-reality display screen including one or more graphical portals for receiving the graphical object, the mixed-reality display screen having a side-by-side positional relationship with the display monitor when viewed via the mixed-reality device, said one or more graphical portals on the particular display screen provided by the display monitor and said one or more graphical portals on the mixed-reality display screen providing a conduit for passing the graphical object between the particular display screen provided by the display monitor and the mixed-reality display screen.

12. The one or more computing devices of claim 11, wherein the mixed-reality device is a head-mounted display.

13. The one or more computing devices of claim 1, wherein the operations further comprise:

removing display of the graphical object in the graphical source portal and in said two or more graphical destination portals;

detecting that the user is located within a prescribed proximity of the chosen destination screen; and in response to said detecting that the user is located within a prescribed proximity of the chosen destination screen, selectively displaying the graphical object as positionally coupled to one or more graphical portals associated with the chosen destination screen, the hardware logic circuitry being configured to perform said selectively displaying only with respect to the chosen destination screen.

14. The one or more computing devices of claim 1, wherein the operations further comprise:

removing display of the graphical object in the graphical source portal and in said one or more graphical destination portals; and following said removing display of the graphical object in the graphical source portal and in said one or more graphical destination portals, and in response to a triggering event, selectively displaying the graphical object as positionally coupled to one or more graphical portals associated with the chosen destination screen, the hardware logic circuitry being configured to perform said selectively displaying only with respect to the chosen destination screen.

15. The one or more computing devices of claim 1, wherein the first movement encompasses movement across a portion of the source screen that is neither the graphical source portal nor the source domain, and wherein the second movement encompasses movement across a portion of the chosen destination screen that is neither the chosen graphical destination portal nor the target domain.

16. The one or more computing devices of claim 1, wherein said detecting that the user has removed the graphical object involves detecting whether the user has removed the graphical object from the chosen graphical destination portal within a predetermined amount of time following placement of the graphical object into the graphical source portal, wherein the hardware logic circuitry is configured to remove the graphical object from the graphical source portal and said two or more graphical destination portals based on a determination that the user has not removed the graphical object from the chosen graphical destination portal within the predetermined amount of time.

17. A method, implemented by a portal management component provided by one or more computing devices, for facilitating interaction with plural display screens, comprising:

receiving a movement-initiation signal from a source component that indicates that a user has commenced a drag operation by touching a graphical object, the source component being an application or a software component of an operating system of said one or more computing devices;

displaying a representation of a first movement as the user moves the graphical object across a source screen, starting from a source domain presented on the source screen by the source component, the source screen being one of the plural display screens;

detecting that the user has moved the graphical object into a graphical source portal provided by the source screen, the graphical source portal being presented in response to a determination that the user has commenced the drag operation;

suspending but not terminating the drag operation when the user moves the graphical object into the graphical source portal, the portal management component representing the drag operation as being suspended but not terminated when the user moves the graphical object into the graphical source portal;

in response to said detecting that the user has moved the graphical object into the graphical source portal, associating the graphical object with the graphical source portal and two or more graphical destination portals provided by two or more destination screens, said two or more destination screens being two or more screens of the plural display screens, wherein upon said associating, at least part of the graphical object is simultaneously presented in the source portal and each of said two or more graphical destination portals;

the graphical object being accessible from the graphical source portal and each of said two or more graphical destination portals;

detecting that the user has removed the graphical object from a chosen graphical destination portal in a chosen destination screen, the chosen destination screen being one of said two or more destination screens that is different from the source screen;

in response to detecting that the user has removed the graphical object from the chosen destination portal, disassociating the graphical object from the graphical source portal and each of said two or more graphical destination portals;

displaying a second movement as the user moves the graphical object across the chosen destination screen to a final destination on the chosen destination screen;

detecting that the user has removed his or her touch of the graphical object at the final destination, and, in response to said detecting that the user has removed his or her touch, determining that the user has completed the drag operation that commenced when the user first touched the graphical object in the source domain; and sending a movement-termination signal to the source component, the movement-termination signal indicating that the drag operation has terminated, the portal management component including instructions that represent the first movement and the second movement as parts of a same drag operation, and wherein the plural display screens are arranged in an array that includes at least one row of side-by-side display screens.

18. The method of claim 17, wherein the method further includes:

following movement of the graphical object into the graphical source portal, none of the plural display screens show the graphical object or any graphical portals; and in response to a triggering event, selectively displaying the graphical object as positionally coupled to one or more graphical portals associated with the chosen destination screen, the portal management component performing said selectively displaying only with respect to the chosen destination screen.

19. A computer-readable storage medium for storing computer-readable instructions, the computer-readable instructions, when executed by one or more hardware processors, performing a method for facilitating interaction with plural display screens that comprises:

in response to a first movement by a user of a graphical object into a graphical source portal on a source screen, simultaneously displaying at least part of the graphical object as being positionally coupled to the graphical source portal provided by the source screen and two or more graphical destination portals provided by two or more destination screens, the graphical source screen and said two or more destination screens being respective screens of the plural display screens, at least the graphical source portal being presented in response to a determination that the user has commenced a drag operation, the drag operation commencing when it is detected that the user has touched the graphical object in a source domain of the source screen that is provided by a source component, the graphical object being accessible from the graphical source portal and each of said two or more graphical destination portals;

suspending but not terminating the drag operation when the user moves the graphical object into the graphical source portal, the instructions representing the drag operation as being suspended but not terminated when the user moves the graphical object into the graphical source portal;

detecting that the user has removed the graphical object from a chosen graphical destination portal in a chosen destination screen, the chosen destination screen being one of said two or more destination screens that is different from the source screen;

in response to detecting that the user has removed the graphical object, displaying the graphical object as having been removed from the graphical source portal and each of said two or more graphical destination portals;

displaying a second movement as the user moves the graphical object across the chosen destination screen to a final destination of the chosen destination screen;

detecting that the user has removed his or her touch of the graphical object at the final destination, and, in response to said detecting that the user has removed his or her touch, determining that the user has completed the drag operation that commenced when the user first touched the graphical object in the source domain; and sending a movement-termination signal to the source component that provides the source domain, the movement-termination signal indicating that the drag operation has terminated, the instructions implementing a process flow that represents the first movement and the second movement as parts of a same drag operation, wherein the plural display screens are arranged in an array that includes at least one row of side-by-side display screens.

* * * * *